(12) United States Patent
Park et al.

(10) Patent No.: US 10,619,054 B2
(45) Date of Patent: Apr. 14, 2020

(54) POROUS LAYER, LOW-REFLECTIVE COATING LAYER, OPTICAL MEMBER, AND METHODS OF FABRICATING THE POROUS LAYER

(71) Applicant: UNIVERSITY-INDUSTRY FOUNDATION (UIF), YONSEI UNIVERSITY, Seoul (KR)

(72) Inventors: Cheolmin Park, Seoul (KR); Giyoung Song, Seoul (KR); Suk Man Cho, Gyeonggi-do (KR)

(73) Assignee: UNIVERSITY-INDUSTRY FOUNDATION (UIF), YONSEI UNIVERSITY, Seoul (KR)

( * ) Notice: Subject to any disclaimer, the term of this patent is extended or adjusted under 35 U.S.C. 154(b) by 277 days.

(21) Appl. No.: 15/462,478

(22) Filed: Mar. 17, 2017

(65) Prior Publication Data

US 2017/0355860 A1 Dec. 14, 2017

(30) Foreign Application Priority Data

Jun. 9, 2016 (KR) ........................ 10-2016-0071578

(51) Int. Cl.
*C08J 9/26* (2006.01)
*C09D 5/00* (2006.01)
*G02B 1/111* (2015.01)
*G02B 1/118* (2015.01)

(52) U.S. Cl.
CPC ................ *C09D 5/006* (2013.01); *C08J 9/26* (2013.01); *G02B 1/111* (2013.01); *G02B 1/118* (2013.01); *C08J 2201/0462* (2013.01); *C08J 2325/06* (2013.01); *C08J 2325/18* (2013.01); *C08J 2383/08* (2013.01)

(58) Field of Classification Search
CPC ...... C08J 9/26; C08J 2325/06; C08J 2325/18; C08J 2383/08; C09D 5/006
See application file for complete search history.

(56) References Cited

PUBLICATIONS

Functionalized Soft Nanoporous Materials through Supramolecular Assembly of End-Functionalized Polymer Blends, Son et al., Chemistry, a European Journal, Oct. 25, 2012.*

\* cited by examiner

*Primary Examiner* — Irina S Zemel

(57) ABSTRACT

Provided are a low-reflective coating layer, a porous layer, a method of fabricating the porous layer, and an optical member including the porous layer. According to an embodiment, a low-reflective coating layer comprising a porous film having hollow sphere structures or bowl-like structures is provided. Each hollow sphere structure or bowl-like structure may have cavity formed therein. The hollow sphere structures or the bowl-like structures may be formed from spherical micelles, and each spherical micelle may be formed by self-assembling a supramolecular complex of a first compound block and a second compound block. In addition, the first compound block may constitute a backbone of the supramolecular chemical compound and the second compound block may constitute a side chain of the supramolecular. The second compound block may be non-covalent bonded to the first compound block.

10 Claims, 16 Drawing Sheets

POROUS LAYER, LOW-REFLECTIVE COATING LAYER, OPTICAL MEMBER, AND METHODS OF FABRICATING THE POROUS LAYER

CROSS-REFERENCE TO RELATED APPLICATION

This application claims priority of Korean Patent Application No. 10-2016-0071578, filed on Jun. 9, 2016, in the KIPO (Korean Intellectual Property Office), the disclosure of which is incorporated herein entirely by reference.

BACKGROUND OF THE INVENTION

Field of the Invention

The present disclosure relates to a low reflective coating technique, and more particularly, to a low-reflective coating layer, an optical member including the low-reflective coating layer, and a method of fabricating the low-reflective coating layer and the optical member.

Description of the Related Art

Various functional coatings, such as a hard coating or an electrostatic prevention coating, may be applied to a surface of an optically transparent or light transmissive products, such as an eyeglass lens, a display device, a transparent film for the display device, and a glass. As a functional coating layer, low-reflective coating layer or antireflection coating layer may be applied to enhance optical performances of the light transmissive material by suppressing reflection of light from a surface of the light transmissive products.

Low-reflective coating methods may be generally categorized into dry coating methods and wet coating methods. The dry coating methods may include vacuum deposition methods, such as e-beam and sputtering, whereas the wet coating methods may include solution coating method, such as spinning, dipping, or flow coating.

As an example of conventional dry coating methods, Aluminum (Al), Titanium (Ti), or Zirconium (Zr) containing oxide or oxynitride having high refractive index, and a Silicon (Si) containing oxide or oxynitride having low refractive index are vacuum-deposited alternately layer by layer for fabricating a low-reflective coating layer. In this case, expensive coating equipments are required, and thus the overall fabrication cost increases.

Meanwhile, slit die coating or spray coating method, which are categorized as a wet coating method commonly used for producing a low-reflective optical glass substrate, has advantages for forming large area coating layer, high reproducibility, process unification and throughput based on high coating speed. However, the wet coating methods has disadvantages including narrow process window due to relatively large sensitiveness to coating process conditions, and very low durability of coating films, and relatively harmful solvents or precursors.

SUMMARY OF THE INVENTION

According to an embodiment of the present disclosure, a low-reflective coating layer exhibiting excellent low reflectivity and a method of fabricating the same may be provided.

According to other embodiment of the present disclosure, a porous layer, an optical member and a method of fabricating the porous layer may be provided by utilizing simple processes and obtaining an additional function due to a potential function group.

Additional aspects will be set forth in part in the description which follows and, in part, will be apparent from the description, or may be learned by practice of the presented embodiments.

In an example, a low-reflective coating layer comprising a porous film having hollow sphere structures or bowl-like structures may be provided. Each hollow sphere structure or bowl-like structure may have cavity formed therein. The hollow sphere structures or the bowl-like structures may be formed from spherical micelles, and each spherical micelle may be formed by self-assembling a supramolecular complex of a first compound block and a second compound block. The first compound block may constitute a backbone of the supramolecular chemical compound and the second compound block may constitute a side chain of the supramolecular and the second compound block may be non-covalent bonded to the first compound block. Pores of the porous film may be defined by the cavity and the cavity may be formed by removing the first compound block selectively from the spherical micelles and remaining the second compound block as a body of each of the hollow sphere structures or the bowl-like structures.

In an example, each spherical micelle may have a core layer and a shell layer surrounding the core layer. The first compound block may constitute the core layer and the second compound block layer constitutes the shell layer. The first compound block may have solubility higher than that of the first compound block with respect to the etching solvent.

The diameter of the spherical micelles may be adjusted by controlling the blend ratio of the first compound block and the second compound block. The blend ratio of the first compound block in the first compound block and the second compound block may be within 0.2 and 0.5.

In an example, the first compound block may comprise a functional group selected from a group consisting of —X2-(C=X4)-X3-, —NR5-(SO2)-, —CO—NR6-CO—, —O—, —S—, —COOH, —CN, —NR7R8, —OH, and —SH. In addition, each of the X2 and the X3 may be any one of a single bond, —NR9-, —O—, and —(CR10R11)$_m$—. Each of the R5, R6, R7, R8, R9, R10, and R11 may represent a hydrogen atom or an alkyl group having a substituent, and m represents an integer equal to or greater than 1.

In an example, the first compound block may comprise any one or more of poly-2-vinyl-pyridine (P2VP), pyrimidine, 2-methylpyrimidine, 4-methylpyrimidine, 5-methylpyrimidine, 4,6-dimethylpyrimidine, 4,6-methoxypyrimidine, 2-ethylpyrimidine, 4-ethylpyrimidine, 5-ethylpyrimidine, 4,6-diethylpyrimidine, 2-methoxypyrimidine, 4-methoxypyrimidine, 5-methoxypyrimidine, 2-ethoxypyrimidine, 4-methoxypyrimidine, 5-ethoxypyrimidine polyamic acid, and polyolefin ketone. The second compound block may comprise any one or more of sulfonic acid terminated polystyrene (SPS), syndiotactic polystyrene, polystyrene, sulfuronite polystyrene, and sulfuronite silsesquioxane.

The second compound block may have a functional group and the functional group may be non-covalent bonded to the first compound block. The functional group may remain on the inner surface of the cavity for serving a potential functional site.

According to other embodiment, a porous layer comprising hollow sphere structures or bowl-like structures may be provided. Each hollow sphere structures or bowl-like structures may have cavity formed therein. The hollow sphere structures or the bowl-like structures may comprise 3D network graft molecules, and the 3D network graft molecules may define the cavity. The 3D network graft molecules may have functional group distributed mainly on an inner surface of the cavity. The 3D network graft molecules may comprise any one or more of sulfonic acid terminated polystyrene (SPS), syndiotactic polystyrene, polystyrene, sulfuronite polystyrene, and sulfuronite silsesquioxane.

According to another embodiment, a method of fabricating a porous layer may be provided. The method may comprise forming a polymer layer on a substrate. The polymer layer may comprise spherical micelles, and each spherical micelle may have a core layer and a shell layer surrounding the core layer. Each spherical micelle may be formed by self-assembling a supramolecular complex of a first compound block and a second compound block, and the first compound block may constitute the core layer and the second compound block may constitute the shell layer. An etching solvent may be applied to the spherical micelles in the polymer layer to remove the core layer of each spherical micelle to form hollow sphere structures or bowl-like structures. Each hollow sphere structure or bowl-like structure may have cavity formed therein and pores of the porous layer may be defined by the cavity.

Diameter of the spherical micelles may be adjusted by controlling the blend ratio of the first compound block and the second compound block. The blend ratio of the first compound block in the first compound block and the second compound block may be within 0.2 and 0.5.

In an example, the second compound block may be non-covalent bonded to the first compound block. The first compound block may comprise a functional group selected from a group consisting of —X2-(C=X4)-X3-, —NR5-(SO2)-, —CO—NR6-CO—, —O—, —S—, —COOH, —CN, —NR7R8, —OH, and —SH. Each of the X2 and the X3 may be any one of a single bond, —NR9-, —O—, and —(CR10R11)$_m$—. Each of the R5, R6, R7, R8, R9, R10, and R11 may represent a hydrogen atom or an alkyl group having a substituent, and m may represent an integer equal to or greater than 1.

The first compound block may comprise any one or more of poly-2-vinyl-pyridine (P2VP), pyrimidine, 2-methylpyrimidine, 4-methylpyrimidine, 5-methylpyrimidine, 4,6-dimethylpyrimidine, 4,6-methoxypyrimidine, 2-ethylpyrimidine, 4-ethylpyrimidine, 5-ethylpyrimidine, 4,6-diethylpyrimidine, 2-methoxypyrimidine, 4-methoxypyrimidine, 5-methoxypyrimidine, 2-ethoxypyrimidine, 4-methoxypyrimidine, 5-ethoxypyrimidine polyamic acid, and polyolefin ketone. The second compound block may comprise any one or more of sulfonic acid terminated polystyrene (SPS), syndiotactic polystyrene, polystyrene, sulfuronite polystyrene, and sulfuronite silsesquioxane.

According to another embodiment, an optical member comprising a porous layer may be provided. In one example, the porous layer may comprise hollow sphere structures or bowl-like structures, and each hollow sphere structure or bowl-like structure may have cavity formed therein. The hollow sphere structures or the bowl-like structures may be formed from spherical micelles, and each spherical micelle may be formed by self-assembling a supramolecular complex of a first compound block and a second compound block. Pore of the porous film may be defined by the cavity, and the cavity may be formed by removing the first compound block selectively from the spherical micelles and remaining the second compound block as a body of each of the hollow sphere structures or the bowl-like structures.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1A:
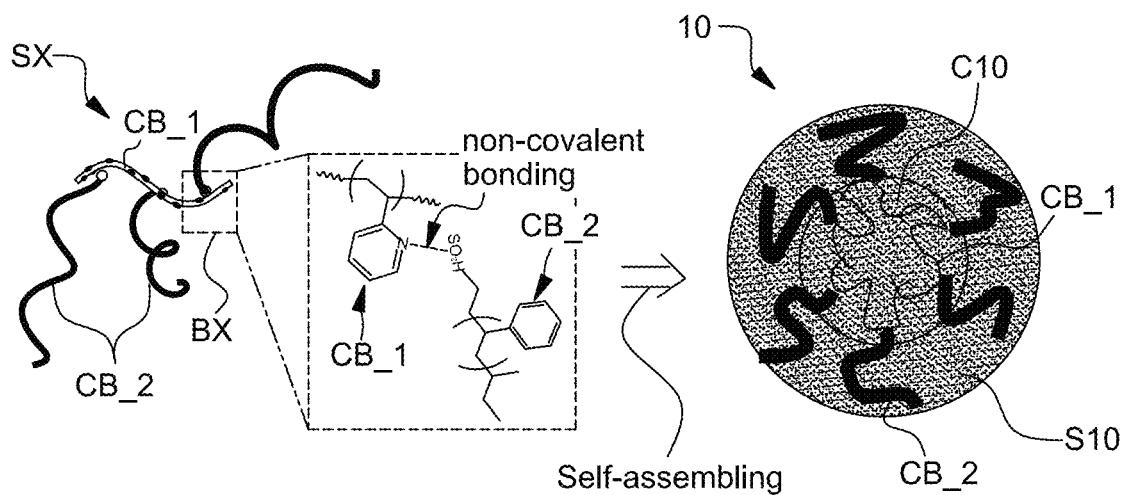
FIGS. 1A through 1C are cross-sectional diagrams illustrating a method of fabricating a low-reflective coating layer having pores therein according to an example of the present disclosure.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1B:
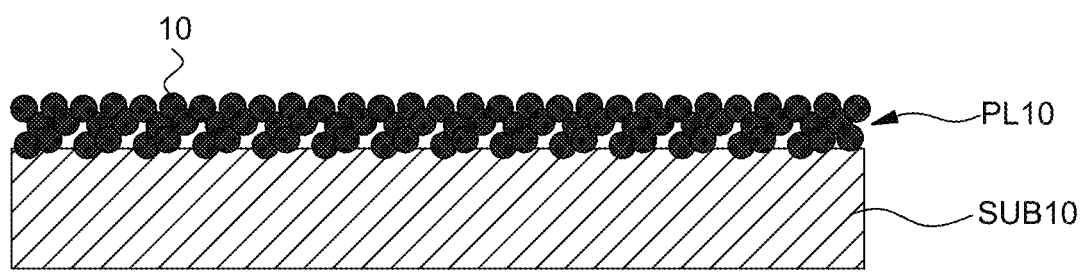
Figure 1C:
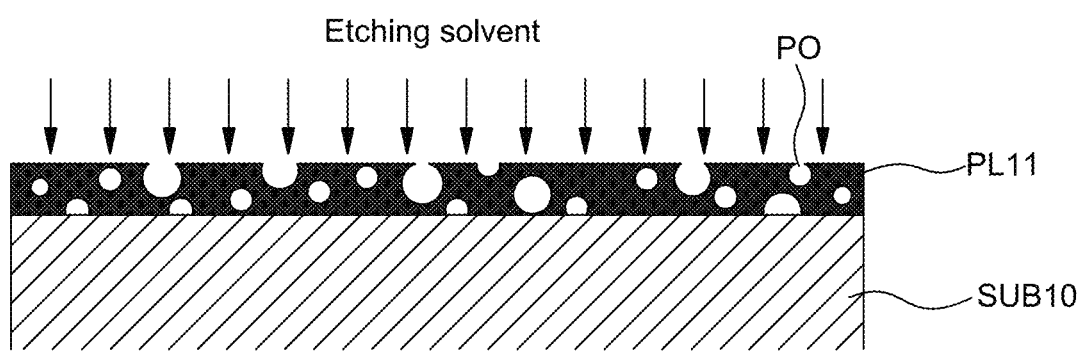

FIG. 1A shows a supramolecular chemical compound SX according to the present disclosure, and FIGS. 1B and 1C are cross-sectional diagrams illustrating a method of fabricating a low-reflective coating layer PL11 having pores PO therein according to an example of the present disclosure.

Referring to FIG. 1A, a self-assembled spherical micelle 10 may be formed by chemically combining a first compound block CB_1 and a second compound block CB_2 to form supramolecular chemical compound or supramolecular complex SX. The chemically combined first compound block CB_1 and second compound block CB_2 is illustrated as a graft-copolymer-like supramolecular complex SX. The first compound block CB_1 may function a backbone of the supramolecular complex SX, and one or more second compound blocks CB_2 can be chemically combined to the backbone as grafts. In FIG. 1A, for an example, three of second compound blocks CB_2 are chemically combined to the first compound block CB_1. In example, the first compound block CB_1 may have one or more chemical bond sites BX where the second compound block CB_2 may be chemically bonded to the first compound block CB_1 by the non-covalent bonding, such as hydrogen bonding, ionic interaction, charge-transfer interactions or coordination complexation and halogen bonding, or combination thereof.

A plurality of the graft-copolymer-like supramolecular complex SX may be self-assembled to form the self-assembled spherical micelle 10. The self-assembled spherical micelle 10 may be nanometer-scaled copolymer structure. In an example, the self-assembled spherical micelle 10 has an average diameter from 20 nm to 150 nm, and preferably from 20 nm to 90 nm. In this case, one or both of the first compound block CB_1 and the second compound block CB_2 may be a molecular-level building block.

The average diameter of the self-assembled spherical micelle 10 may be tunable by controlling the blend ratio of the first compound block to the first compound block CB_1 and second compound block CB_2, or concentration of a solution having the compound blocks CB_1 and CB_2 and a dispersion solvent for them, as it will be described below.

Since the first compound block CB_1 and the second compound block CB_2 may be bonded to each other only by the non-covalent bonding, for example the hydrogen bonding, facile etchability of specific domains, for example, the first compound block CB_1 from the self-assembled spherical micelle 10 may be implemented. An etching process may be performed by dissociating the supramolecular non-covalent bonds BX between the first compound block CB_1 and the second compound block CB_2, for example, by using a selective etching solvent, as will be described in detail.

In an example, one or both of the first compound block CB_1 and the second compound block CB_2 may have a functional group. In an example, the functional group may be contained only in the second compound block CB_2. In FIG. 1A, it is illustrated as an example that a plurality of the second compound blocks CB_2 have functional group of sulfonic acid, SO3H. The plurality of the second compound blocks CB_2 are chemically bonded with the first compound block CB_1 based on a hydrogen bonding between the sulfonic acid functional group of the second compound block CB_2 with nitrogen atom of the first compound block CB_1 at the chemical bond sites BX of the first compound CB_1.

The first compound block CB_1 or the second compound block CB_2 may include at least one functional group selected from the above-stated group per one molecular building block. Preferably, as above mentioned, only the second compound block CB_2 may include at least one functional group selected from the above-stated group per one molecular building block. In an example, the number of the functional groups contained in the second compound block CB_2 may be 2 or more per molecule, may preferably be from 2 to 8 per molecule, and may more preferably be from 2 to 6 per molecule. In the FIG. 1A, as an example, the first compound block CB_1 or the second compound block CB_2 are a compound having a ring-type structure RC_1 and RC_2 including a hetero atom in a ring, which may be called as a hetero ring. However, according to another example, the first compound block CB_1 or the second compound block CB_2, the polymer may be a compound including a hetero ring.

In an example, the first compound block CB_1 or the second compound block CB_2, for example, only the second compound block CB_2 may be a chemical compound precursor having a functional group capable of the hydrogen bonding between each other, and the functional groups may be any one or more functional groups selected from a group consisting of —SO2H, —X2-(C=X4)-X3-, —NR5-(SO2)-, —CO—NR6-CO—, —O—, —S—, —COOH, —CN, —NR7R8, —OH, and —SH. The X2 and X3 represents a single bond compound, such as —NR9-, —O— or —(CR10R11)m-, the R5, R6, R7, R8, R9, R10, and R11 represents a hydrogen atom or an alkyl group having a substituent group, and m represents an integer equal to or greater than 1.

A substituent group for substituting the alkyl group having the substituent group may include any one or more of an alkyl group (preferably having from 1 to 20 carbon atoms, more preferably having from 1 to 12 carbon atoms, and yet more preferably having from 1 to 8 carbon atoms; e.g., a methyl group, an ethyl group, an isopropyl group, a tert-butyl group, an n-octyl group, a n-decyl group, a n-hexadecyl group, a cyclopropyl group, a cyclopentyl group and a cyclohexyl group, etc.), an alkenyl group (preferably having from 2 to 20 carbon atoms, more preferably having from 2 to 12 carbon atoms, and yet more preferably having from 2 to 8 carbon atoms; e.g., a vinyl group, an allyl group, a 2-butenyl group, a 3-pentenyl group, etc.), an alkynyl group (preferably having from 2 to 20 carbon atoms, more preferably having from 2 to 12 carbon atoms, and yet more preferably having from 2 to 8 carbon atoms; e.g., a propargyl group, a 3-pentynyl group, etc.), an aryl group (preferably having from 6 to 30 carbon atoms, more preferably having from 6 to 20 carbon atoms, and yet more preferably having from 6 to 12 carbon atoms; e.g., a phenyl group, a biphenyl group, a naphthyl group, etc.), an amino group (preferably having from 0 to 20 carbon atoms, more preferably having from 0 to 10 carbon atoms, and yet more preferably having from 0 to 6 carbon atoms; e.g., an amino group, a methylamino group, a dimethylamino group, a diethylamino group, a dibenzylamino group, etc.), an alkoxy group (preferably having from 1 to 20 carbon atoms, more preferably having from 1 to 12 carbon atoms, and yet more preferably having from 1 to 8 carbon atoms; e.g., a methoxy group, an ethoxy group, a butoxy group, etc.), an aryloxy group (preferably having from 6 to 20 carbon atoms, more preferably having from 6 to 16 carbon atoms, and yet more preferably having from 6 to 12 carbon atoms; e.g., a phenyloxy group, a 2-naphthyloxy group, etc.), an acyl group (preferably having from 1 to 20 carbon atoms, more preferably having from 1 to 16 carbon atoms, and yet more preferably having from 1 to 12 carbon atoms; e.g., an acetyl group, a benzoyl group, a formyl group, a pivaloyl group, etc.), an alkoxycarbonyl group (preferably having from 2 to 20 carbon atoms, more preferably having from 2 to 16 carbon atoms, and yet more preferably having from 2 to 12 carbon atoms; e.g., a methoxycarbonyl group, an ethoxycarbonyl group, etc.), an aryloxycarbonyl group (preferably having from 7 to 20 carbon atoms, more preferably having from 7 to 16 carbon atoms, and yet more preferably having from 7 to 10 carbon atoms; e.g., a phenyloxycarbonyl group), an acyloxy group (preferably having from 2 to 20 carbon atoms, more preferably having from 2 to 16 carbon atoms, and yet more preferably having from 2 to 10 carbon atoms; e.g., an acetoxy group, a benzoyloxy group, etc.), an acylamino group (preferably having from 2 to 20 carbon atoms, more preferably having from 2 to 16 carbon atoms, and yet more preferably having from 2 to 10 carbon atoms; e.g., acetylamino group, a benzoylamino group, etc.), an alkoxycarbonyl amino group (preferably having from 2 to 20 carbon atoms, more preferably having from 2 to 16 carbon atoms, and yet more preferably having from 2 to 12 carbon atoms; e.g., methoxycarbonylamino group), an aryloxycarbonylamino group (preferably having from 7 to 20 carbon atoms, more preferably having from 7 to 16 carbon atoms, and yet more preferably having from 7 to 12 carbon atoms; e.g., a phenyloxycarbonylamino group, a sulfonylamino group (preferably having from 1 to 20 carbon atoms, more preferably having from 1 to 16 carbon atoms, and yet more preferably having from 1 to 12 carbon atoms; e.g., a methanesulfonylamino group, a benzenesulfonylamino group, etc.), a sulfamoyl group (preferably having from 0 to 20 carbon atoms, more preferably having from 0 to 16 carbon atoms, and yet more preferably having from 0 to 12 carbon atoms; e.g., a sulfamoyl group, a methylsulfamoyl group, a dimethylsulfamoyl group, a phenylsulfamoyl group, etc.), a carbamoyl group (preferably having from 1 to 20 carbon atoms, more preferably having from 1 to 16 carbon atoms, and yet more preferably having from 1 to 12 carbon atoms; e.g., a carbamoyl group, a methylcarbamoyl group, a diethylcarbamoyl group, a phenylcarbamoyl group, etc.), an alkylthio group (preferably having from 1 to 20 carbon atoms, more preferably having from 1 to 16 carbon atoms, and yet more preferably having from 1 to 12 carbon atoms; e.g., a methylthio group, an ethylthio group, etc.), arylthio groups (preferably having from 6 to 20 carbon atoms, more preferably having from 6 to 16 carbon atoms, and yet more preferably having from 6 to 12 carbon atoms; e.g., a phenylthio group), a sulfonyl group (preferably having from 1 to 20 carbon atoms, more preferably having from 1 to 16 carbon atoms, and yet more preferably having from 1 to 12 carbon atoms; e.g., a mesyl group, a tosyl group, etc.), a sulfinyl group (preferably having from 1 to 20 carbon atoms, more preferably having from 1 to 16 carbon atoms, and yet more preferably having from 1 to 12 carbon atoms; e.g., a methanesulfinyl group, a benzenesulfinyl group, etc.), a urethane group or a ureide group (preferably having from 1 to 20 carbon atoms, more preferably having from 1 to 16 carbon atoms, and yet more preferably having from 1 to 12 carbon atoms; e.g., a ureide group, a methylureide group, a phenylureide group, etc.), a phosphoric acid amide group (preferably having from 1 to 20 carbon atoms, more preferably having from 1 to 16 carbon atoms, and yet more preferably having from 1 to 12 carbon atoms; e.g., a diethylphosphoric acid amide, a phenylphosphoric acid amide, etc.), a hydroxyl group, a mercapto group, a halogen atom (e.g., a fluorine atom, a chlorine atom, a bromine atom, and an iodine atom), a cyano group, a sulfo group, a carboxyl group, a nitro group, a hydroxamic acid group, a sulfino group, a hydrazino group, an imino group, a hetero ring group (preferably having from 1 to 30 carbon atoms and more preferably having from 1 to 12 carbon atoms; hetero atoms include a nitrogen atom, an oxygen atom, and a sulfur atom, for example, and more particularly, an imidazolyl group, a pyridyl group, a quinolyl group, a furyl group, a piperidyl group, a morpholino group, a benzyloxazolyl group, a benzimidazolyl group, a benzothiazolyl group, etc.), and a silyl group (preferably having from 3 to 40 carbon atoms, more preferably having from 3 to 30 carbon atoms, and yet more preferably having from 3 to 24 carbon atoms; e.g., a trimethylsilyl group, a triphenylsilyl group, etc). The above compounds are provided only as an example, and the present invention is not limited hereto.

According to an embodiment, the alkyl group having a substituent group is preferably an alkyl group having a substituent group and having from 1 to 3 carbon atoms, more preferably an unsubstituted alkyl group having from 1 to 3 carbon atoms, and yet more preferably a methyl group, an ethyl group, or an isopropyl group. The —NR9- is preferably —NH—. The —(CR10R11)m- is an alkylene group that may be substituted by an alkyl group which may have a substituent group. The alkyl group is preferably an unsubstituted alkyl group and is more preferably an unsubstituted alkyl group having from 1 to 4 carbon atoms. Preferably, in CR10R11, at least one of R10 and R11 is a hydrogen atom or both of R10 and R11 may be hydrogen atoms. The m is an integer equal to or greater than 1 and is preferably an integer from 1 to 3. The X4 represents an oxygen atom or a sulfur atom, and preferably represents an oxygen atom.

The first compound block CB_1 may be preferably a group selected from the above-mentioned groups, may include one or more —O—C(=O)—NH— per molecule, and may preferably include from 1 to 8 —O—C(=O)—NH— per molecule. According to an example, the first compound block may yet preferably include from 2 to 4 —O—C(=O)—NH— per molecule.

According to an example, the first compound block CB_1 and the second compound block CB_2 may be a molecular level, supramolecular or polymer level precursor. In an example, the first compound block CB_1 may comprise any one or more of poly-2-vinyl-pyridine (P2VP), pyrimidine, 2-methylpyrimidine, 4-methylpyrimidine, 5-methylpyrimidine, 4,6-dimethylpyrimidine, 4,6-methoxypyrimidine, 2-ethylpyrimidine, 4-ethylpyrimidine, 5-ethylpyrimidine, 4,6-diethylpyrimidine, 2-methoxypyrimidine, 4-methoxypyrimidine, 5-methoxypyrimidine, 2-ethoxypyrimidine, 4-methoxypyrimidine, 5-ethoxypyrimidine polyamic acid, and polyolefin ketone. The second compound block may comprise any one or more of sulfonic acid terminated polystyrene (SPS), syndiotactic polystyrene, polystyrene, sulfuronite polystyrene, and sulfuronite silsesquioxane. Preferably, the first compound block CB_1 may have a pyridine in which carbon in the benzene ring is substituted with a nitrogen atom that is susceptible to the hydrogen bonding, and the second compound block CB_2 may be a chemical molecular level compound or polymer including a sulfonate group. In an example, the first compound block CB_1 may be poly(2-vinylpyridine) (P2VP), and the second compound block CB_2 may be a sulfonated polystyrene (SPS).

The first compound block CB_1 and the second compound block CB_2 may be mixed in the dispersion solvent. In the dispersion solvent, the first compound block CB_1 and the second compound block CB_2 may be self-assembled to form the spherical micelle 10. In other example, the self-assembled spherical micelle 10 may be formed during a process of coating a film type layer on a substrate. The dispersion solvent may be any one of an aliphatic or aromatic hydrocarbon (e.g., heptane or toluene, a halogenated aliphatic or aromatic hydrocarbon (e.g., dichloromethane or bromobenzene), an ether (e.g., diethyl ether), or a mixture thereof. Preferably, the dispersion solvent may be benzene or methanol.

In an example, when the graft-copolymer-like supramolecular complex SX comprising the first compound block CB_1 and the second compound block CB_2 is in the dispersion solvent, and the dispersion solvent is a relatively poor solvent for the first compound block CB_1, and has a good affinity with or is compatible for the second compound block CB_2, the first compound block CB_1 tends to reduce the interface area with the dispersion solution, whereas the second compound block CB_2 has a much higher interface area with the first compound block CB_1, resulting in forming the self-assembled spherical micelle 10 from the supramolecular complex SX. During the formation of the self-assembled spherical micelle 10, polymerization between the first compound block CB_1, second compound block CB_2 and the supramolecular complexes SX may be accompanied.

The self-assembled spherical micelle 10 has a core-shell structure. A core layer C10 is disposed inside the spherical micelle 10 and a shell layer S10 surrounding the core layer C10. The first compound block CB_1 which functions as a backbone of the supramolecular complex SX may form the core layer C10, and the second compound block CB_2 which functions as graft parts of the supramolecular complex SX may form the shell layer S10. The graft parts, i.e., the second compound block CB_2 may be mainly in the shell layer S10. The shell layer S10 will become a body of a hollow sphere structure or bowl-like structure having cavity formed therein, which will function as anti-reflective structure, and will be more specifically described hereafter.

The shell layer S10 has a physical, structural and chemical properties originated from the graft-like second compound blocks CB_2. For example, the shell layer S10 may have a predetermined porosity which may be originated from 3-dimensional random network structure of graft molecules of the second compound blocks CB_2. Hereafter, the second compound blocks CB_2 of the shell layer S10 may be called as 3D network graft molecules of 3D network. In addition, the distribution of the functional groups of the second compound blocks CB_2 may be mainly localized to an inner surface of the shell layer S10 due to the self-assembling process, since the back bone of the supramolecular complex SX, i.e., the first compound blocks CB_1 is disposed at a center portion of spherical micelle 10.

In an example, when the first compound block CB_1 may be poly-2-vinylpyridine P2VP and the second compound block CB_2 may be sulfuronite polystyrene SPS, nitrogen (N) atoms of the first compound block CB_1 and oxygen atoms of the sulfonic group of the side chain of the second compound block CB_2 may be hydrogen bonded to each other. In a dispersion solvent, the first compound block CB_1 and the second compound block CB_2 may be self-assembled based on the hydrogen bonding, thereby forming the spherical micelles 10 having a core layer of the first compound block CB_1 and the shell layer of the second compound block CB_2.

Referring to FIG. 1B, a substrate SUB10 may be provided. The substrate SUB10 may have a first surface (e.g., top surface) and a second surface (e.g., bottom surface) opposite to the first surface. The substrate SUB10 may have a flexibility to implement a flexible memory device, flexible photovoltaic device, flexible display device or other devices which a film PL10 (for example, anti-reflection coating) may be applicable to.

The substrate SUB10 may be formed of a light transmissive resin-based material. The resin-based material may be, for example, any one of various cellulose-based resins; polyester resins, such as polyethylene terephthalate (PET) and polyethylene naphthalate (PEN); polyethylene resin; polyvinyl chloride resin; polycarbonate (PC); polyethersulfone (PES); polyetheretherketone (PEEK); polyphenylene sulfide (PPS); polytriphenylamine (PTAA), or a combination thereof. Preferably, the resin-based material may be polytriphenylamine (PTAA).

The substrate SUB10 may be formed of silicate glass. For example, the substrate SUB10 may be formed of soda-lime-silica-based glass. In this case, the substrate SUB10 may be generally referred to as a glass substrate. However, the material of the substrate SUB10 may be various. A light transmissive material other than soda-lime-silica-based glass may be applied to the substrate SUB10.

A mixed solution layer (not shown) including the supramolecular complex SX or the spherical micelles 10 may be formed on the substrate SUB10. The spherical micelles 10 may be formed by self-assembling the first compound block CB_1 and the second compound block CB_2 hydrogen-bonded to each other. For example, the first compound block CB_1 and the second compound block CB_2 may be the compounds described above with reference to FIG. 1A, and the spherical micelle 10 may include the core layer C10 and the shell layer S10 described with reference to FIG. 1A.

The mixed solution layer may be coated or printed on the substrate SUB10 by dipping the substrate SUB10 into the mixed solution comprising the first compound block CB_1, the second compound block CB-2 and supramolecular complex SX, or by providing the mixed solution onto the substrate SUB10. The mixed solution layer may be cast to be polymer layer PL10 by drying the dispersion solvent from the mixed solution layer. A method of coating or printing the mixed solution layer may include, as unlimited examples, spin coating, spray coating, ink jetting, printing, vacuum filtration, impregnation coating, and application coating. In an example, when the mixed solution layer is coated or printed on the substrate SUB10 by the above-described coating or printing methods, the first compound block CB_1 and the second compound block CB_2 contained in the mixed solution layer may be self-assembled on the substrate SUB10. In the polymer layer PL10, the spherical micelles 10 may be substantially uniformly distributed. In an example, the spherical micelles 10 may be closely packed in the polymer layer PL10. In an example, the polymer layer PL10 may include one or more layer of the spherical micelles 10.

In an example, the size (or, average diameter) of the spherical micelle 10 may be adjusted by controlling concentration of the first compound block CB_1 and the second compound block CB_2 with respect to the mixed solution layer or a blend ratio of the first compound block and the second compound block. Adjustment of the size of the spherical micelle 10 will be described below with reference to FIGS. 4A through 4G, 7A through 7G, and 8A through 8F.

Referring to FIG. 1C, a porous layer PL11 may be formed from the polymer layer PL10. An extra first compound block CB_1 and second compound block CB_2 that have not participated in the formation of the spherical micelle 10 may be removed from the mixed solution layer before forming the porous layer PL11. A removal process of the extra first compound block CB_1 and second compound block CB_2 may be a drying process or a washing process. When the removal process is performed, the mixed solution layer may form a polymer layer PL10 in which the spherical micelles 10 are closely packed. According to an embodiment, the size of the spherical micelle 10 may increase as a time for the removal process increases.

Next, the polymer layer PL10 on the substrate SUB10 may be etched by using an etching solvent to remove the first compound block CB_1 selectively from the spherical micelles 10 in the polymer layer PL10, thereby forming a plurality of pores PO in the polymer layer PL10. In the etching process, the etching solvent selectively permeates into the core layer C10, where the first compound block CB_1 is disposed in the spherical micelle 10, to loosen the non-covalent bond, for example, a hydrogen bond between the first compound block CB_1 and the second compound block CB_2. As a result, the core layer C10 including the first compound block CB_1 may be removed from the spherical micelle 10, thereby forming the spherical micelle having a cavity. The arrangement of the spherical micelle having cavities in the polymer layer PL10 may be rendered to be pores PO of the porous layer PL11

As described above, the first compound block CB_1 and the second compound block CB_2 may have different solubility with respect to the etching solvent. Preferably, the first compound block CB_1 may have solubility higher than that of the second compound block CB_2 with respect to the etching solvent.

As disclosed above, the porous layer PL11 having a plurality of pores PO may be formed via the etching process. The thickness of the porous layer PL11 may be, for example, from about 1 nm to about 500 nm. When the thickness of the porous layer PL11 exceeds about 500 nm, it may be difficult to form a plurality of pores via the etching process, and thus the anti-reflection effect may be insufficient. However, it is merely an example, and the thicknesses of the porous layer PL11 may more increase for any purpose.

The etching process may be performed for from about 10 minutes to about 30 minutes. When the etching process may be performed for more than 30 minutes, it may affect not only the core layer C10, but also the shell layer S10. By taking these factors into account, etching conditions may be appropriately controlled. The core layer C10 including the first compound block CB_1 may be removed, and thus the functional group, for example, sulfonated group remains on the internal surface of the shell layer S10 of the spherical micelle 10 having cavities. The remaining functional group, for example, the sulfonated group may serve as a potential functional group of the spherical micelle having the cavity. For example, the sulfonated group may be reversibly hydrogen bonded to a pyrimidine-based compound or a purine-based compound again to form a new self-assembled structure. The sulfonated group may exhibit high proton conductivity to imbue the spherical micelle having the cavity excellent electrochemical stability at a high temperature. However, the function of the potential functional group remaining on the internal surface of the shell layer is not limited thereto.

As shown in FIG. 1C, a surface (top surface) of the porous layer PL11 may be not flat but rough. As described above, since the porous layer PL11 has rough concavo-convex portion defined by the pores PO on at least one surface/interface, the concavo-convex portions may prevent/suppress total reflection, thereby improving the light extraction efficiency.

According to an embodiment of the present disclosure, the concavo-convex portion may be easily formed on the porous layer PL11 using the above-described etching method, and a light emitting member including the concavo-convex portion UN1 may be easily fabricated. Here, the porous layer PL11 on which the concavo-convex portion is formed may be referred to as a surface-textured polymer layer.

Figure 2:
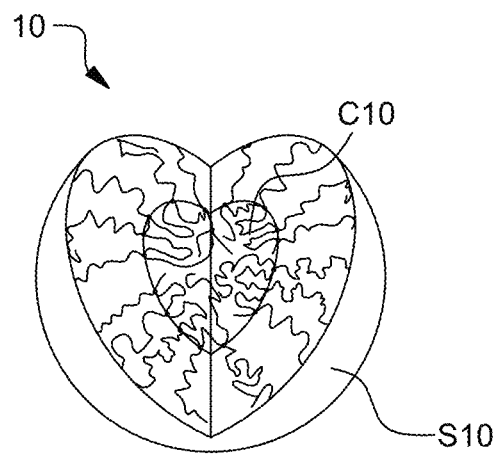
FIG. 2 is a sectional view of a self-assembled spherical micelle incorporated in a low-reflective coating layer according to an example of the present disclosure.

FIG. 2 is a sectional view of a self-assembled spherical micelle 10 contained in a low-reflective coating layer according to an embodiment of the present disclosure.

Referring to FIG. 2, the spherical micelle 10, which may be formed by self-assembling a first compound block CB_1 and a second compound block CB_2 which may form block-copolymer like or graft-copolymer like supramolecular assembly, may include a core layer C10 and a shell layer S10 surrounding the core layer C10. The core layer C10 may include the first compound block CB_1 having a relatively high solubility with respect to an etching solvent used for forming the spherical micelle 10. Furthermore, the shell layer S10 may include a second compound block CB_2 having a relatively poor solubility with respect to the etching solvent. In an example, the second compound block CB_2 may include a side chain non-covalent bonded, for example, hydrogen-bonded to the first compound block CB_2.

According to an embodiment, the second compound block CB_2 may include a sulfonated functional group, and a polar solvent may be used as a dispersion solvent so that a sulfonated second compound block CB_2 may be formed in the shell layer S10. The polar solvent may be any one of benzene, water, ethanol, and methanol or a mixture thereof, but the present disclosure is not limited thereto, and any solvent with a polarity may be utilized.

Figure 3:
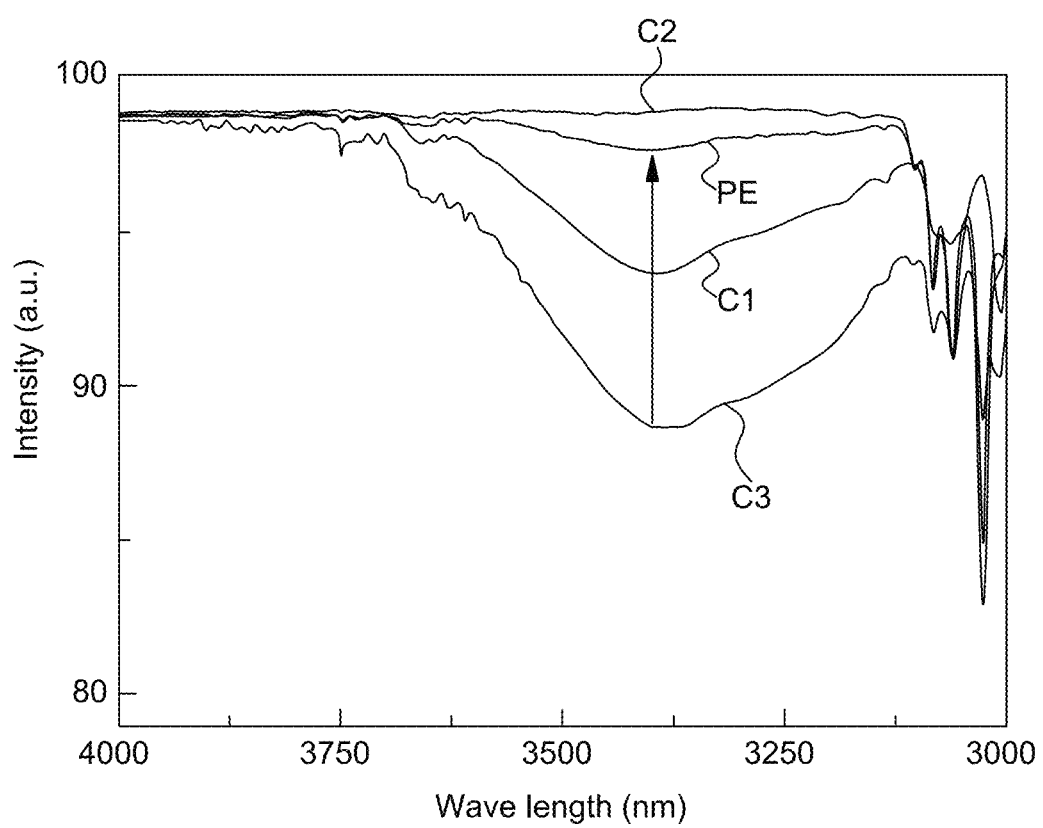
FIG. 3 is a graph showing respective Fourier Transform infrared spectrometry (FTIS) measurement results on low-reflective coating layers according to an example of the present disclosure and comparative examples.

FIG. 3 is a graph showing measurements of Fourier Transform infrared spectrometry (FTIS) on low-reflective coating layers according to an embodiment of the present disclosure and comparative examples.

In order to check whether the first compound block and the second compound block were self-assembled to form the spherical micelles in a mixed solution by a mixing process, FTIS were performed with respect to a mixed solution including sulphonate polystyrene (SPS) and poly-2-vinylpyrimidine (SPS-P2VP) (hereafter, is designated as an experimental example PE); an only P2VP-containing layer, which is an example of the first compound block, (hereafter, is designated as a comparative example C1); an only SPS-containing layer, which is an example of the second compound block (hereafter, is a comparative example C2); and a layer containing a polystyrene-poly-2-vinylpyrimidine (PS-P2VP) (hereafter, is designated as a comparative example C3).

All polymer concentrations in the mixed solutions of PE, and C1 to C3 were fixed at 1 wt %. Because nitrogen atoms in the pyridine unit of P2VP can react with $H_2O$ molecules in the atmosphere, the appearance of a band at about 3.375 nm, which corresponds to vibration of the hydroxyl groups of $H_2O$ molecules, may indicate that certain pyridine units of P2VP remain unreacted in the films. The suppression of the band intensity of the SPS and P2VP mixture in the thin film (SPS-P2VP) apparently suggests that most functional sites of the pyridine unit are noncovalently connected to a sulfonic acid group of SPS for supramolecular complexes and only a small number of sites remain active for $H_2O$ (FIG. 1A, a nitrogen (N) atom in the pyrimidine of P2VP may react with the hydroxyl group of a water molecule ($H_2O$), a band at a point of about 3,375 nm corresponding to vibration of the hydroxyl group of the water molecule indicates that P2VP contains unreacted pyrimidine.

In the graphs regarding P2VP in the comparative examples C1 and C3, the intensity of wavelength is weakened at about 3,375λ, because the pyrimidine of the P2VP compound did not react with other functional groups and reacted with the hydroxyl group of the water molecule ($H_2O$). On the other hand, the experimental example shows that the intensity of wavelength is weaker than those of the comparative examples C1 and C3 at about 3,375 nm. The reason thereof may be that a nitrogen atom in the pyrimidine of P2VP is hydrogen-bonded to the sulfonated group of SPS in a SPS-P2VP mixture, and thus the number of P2VP functional groups to react with the hydroxyl group of the water molecule is reduced. Therefore, it may be confirmed that, in the mixture of SPS and P2VP, a sulfonate group may be hydrogen bonded to the nitrogen atom.

Figure 4A:
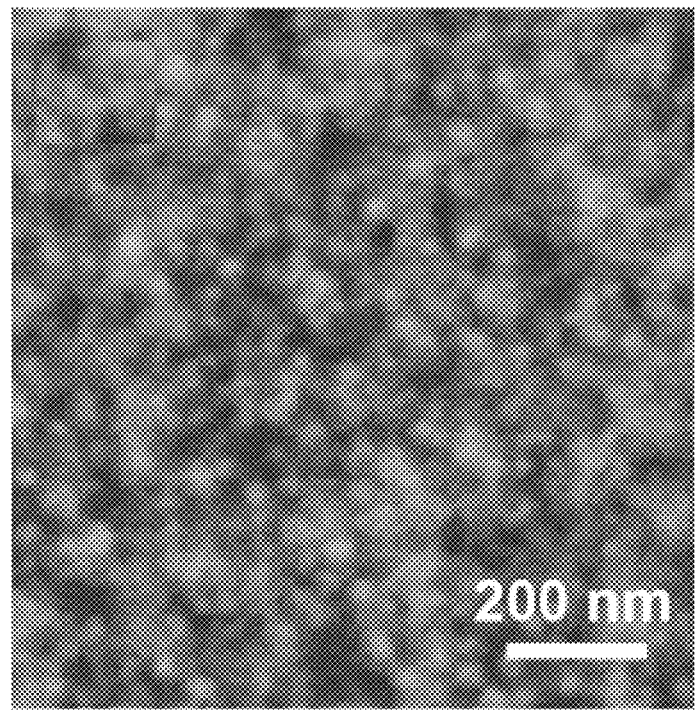
FIGS. 4A through 4D are AFM images of a low-reflective coating layer including self-assembled spherical micelles according to an example of the present disclosure.
Figure 4B:
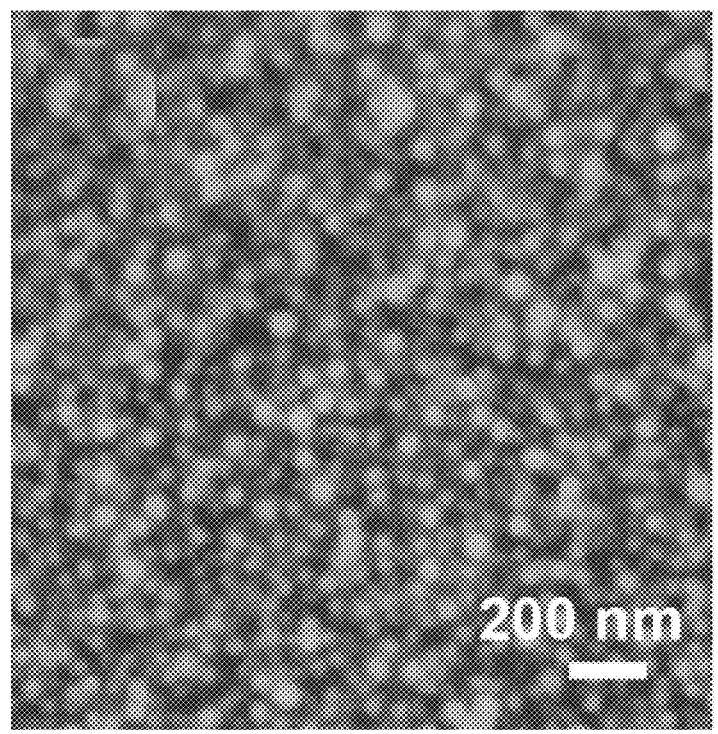
Figure 4C:
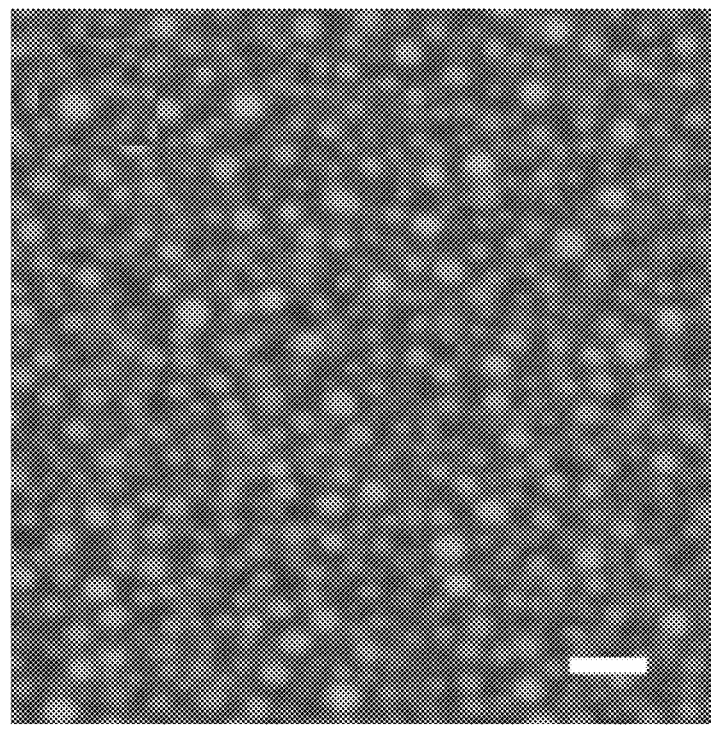
Figure 4D:
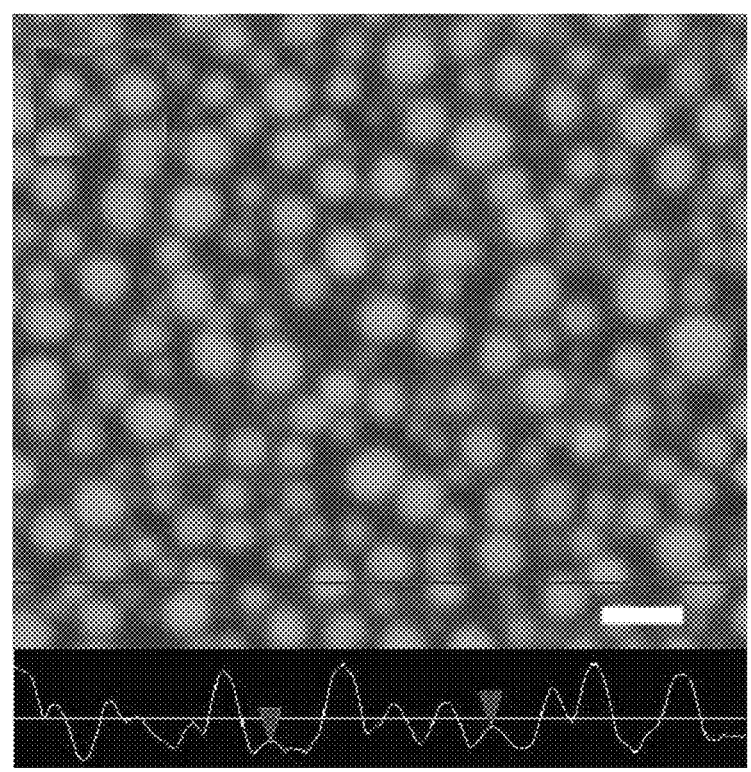
Figure 4E:
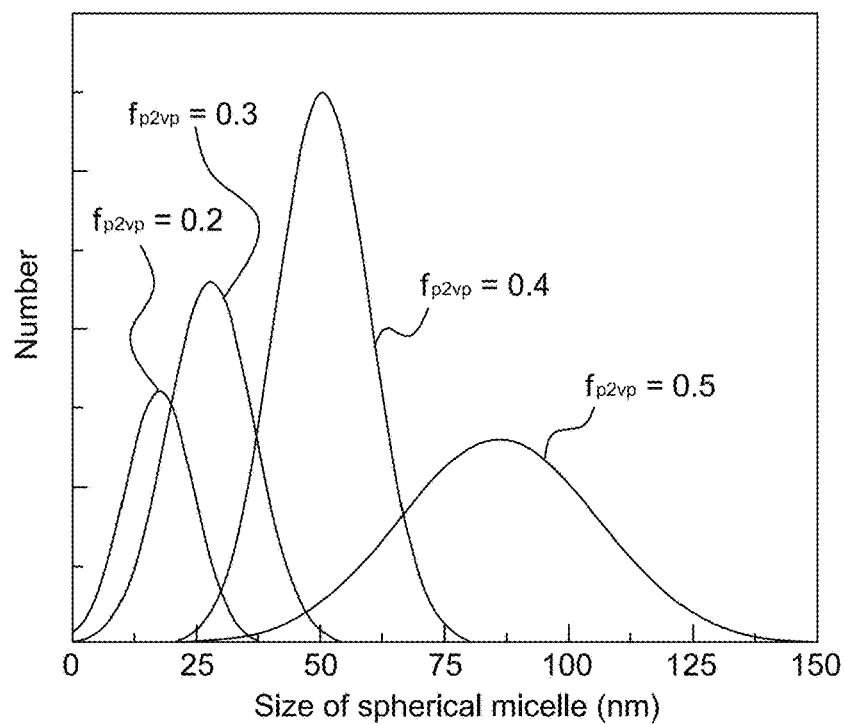
FIGS. 4E and 4F are graphs for illustrating distribution characteristics according to sizes of the spherical micelle.
Figure 4F:
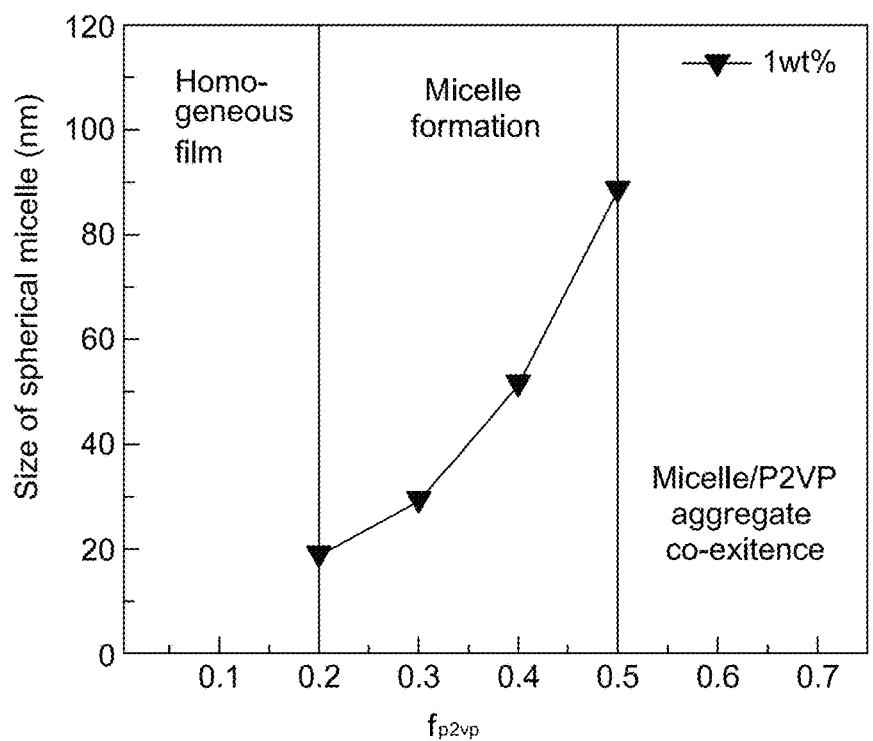

FIGS. 4A through 4D are SEM images of a low-reflective coating layer including self-assembled spherical micelles according to an embodiment of the present disclosure, and FIGS. 4E and 4F are a graph for showing a distribution according to sizes of the spherical micelle, and sizes of the spherical micelles according to polymer concentration ratios at the time of formation of the spherical micelles.

The domain sizes of the core layer and the shell layer of the spherical micelle may be adjusted by controlling a blend ratio of the first compound block and the second compound block. The formation of the spherical micelles may be controlled according to the blend ratio of the first compound block and the second compound block, and therefore the sizes of the core layer and the shell layer of the spherical micelles may be controlled. A polymer layer including spherical micelles was formed while raising the blend ratio (fP2VP) of the first compound block from 0.2 to 0.5 in the first compound block and the second compound block in the polymer layer. SEM images of respective low-reflective coating layers including the polymer layers are shown in FIGS. 4A through 4D. Referring to FIGS. 4A through 4D, as the blend ratio of the first compound block increases from 0.2 to 0.5, the diameter of the spherical micelle gradually increases.

Referring to FIG. 4E, when the blend ratios of the first compound block are 0.2, 0.3, 0.4, and 0.5, the average diameter of the formed spherical micelles increases gradually in the order of about 20 nm, about 25 nm, about 50 nm, and about 80 nm, and the number of the formed spherical micelles also increases. Furthermore, the largest number of the spherical micelles may be provided when the blend ratio of the first compound block is about 0.4 and, when the blend ratio of the first compound block is 0.5, the spherical micelle may have a maximum diameter of about 150 nm.

Referring to FIG. 4F, the blend ratio ($f_{P2VP}$) of the first compound block to the total weight of the polymers (the first compound block and the second compound block) during formation forming the spherical micelle may be from 0.2 to 0.5. When the blend ratio ($f_{P2VP}$) of the first compound block is less than 0.2, a homogeneous layer having an even mixture of the first compound block, the second compound block and supramolecular complexes may be formed instead of forming the spherical micelle. When the blend ratio ($f_{P2VP}$) of the first compound block exceeds 0.5, small spherical micelles and first compound block aggregate may co-exist in the polymer layer, in which uniformly distributed spherical micelles may not be formed.

Figure 4G:
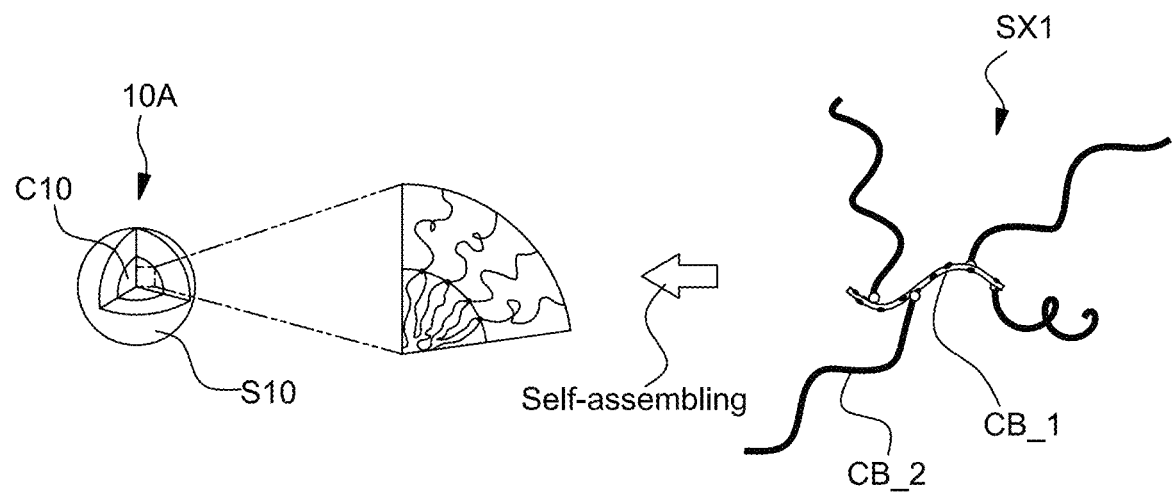
FIG. 4G illustrates size variation of the spherical micelles according to polymer concentration ratios for forming the spherical micelles.
Figure 4G:
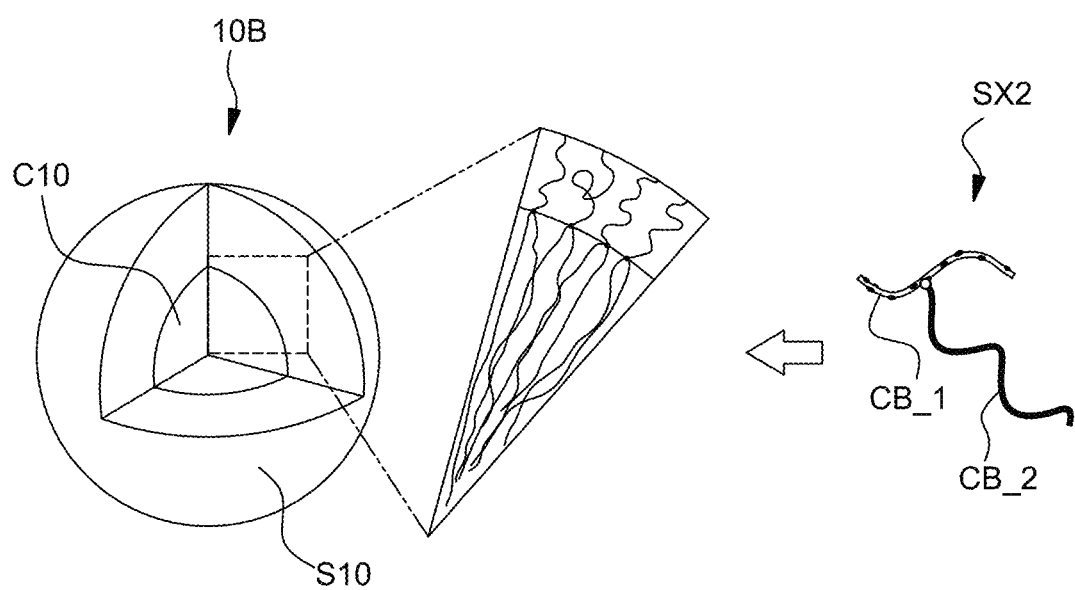

Referring to FIG. 4G, the size variation phenomenon may be consistent with the chain number ratio mechanism in spherical micelles 10 A and 10B. When the spherical micelles 10A and 10B form graft copolymers while the spherical micelles 10 A and 10B were dissolved in good solvent for the corona, the second compound block, it has been found that the more graft chains would make the spherical micelle aggregation numbers low. It can be explained that there are some kinetic limits in corona chains per area of the core, i.e., first compound block CB_1. In other words, if the chain ratio increased (the supramolecular complex SX1 has a greater chain number than the supramolecular complex SX2), the second compound block chain, for example, SPS chain number per area in the corona of the spherical micelles 10 A may not be as stable as an spherical micelles 10B with a low chain number ratio, because the spherical micelles 10 A would be too crowded to be located in the core-shell interface areas, which would make the spherical micelles 10 A unstable. Consequently, the size of the spherical micelles 10 A is smaller than that of a spherical micelles 10 B with a low graft chain number ratio.

Figure 5A:
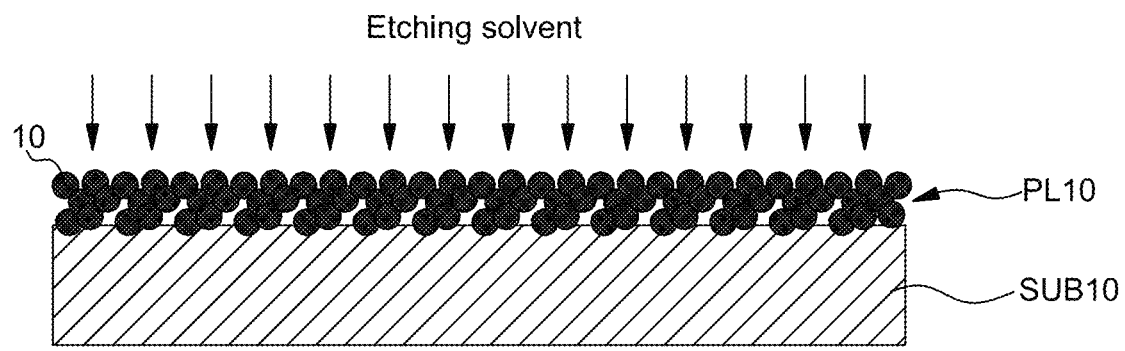
FIGS. 5A and 5B are cross-sectional diagrams showing a wet etching process applicable to fabrication of a low-reflective coating layer having pores therein according to an example of the present disclosure.
Figure 5B:
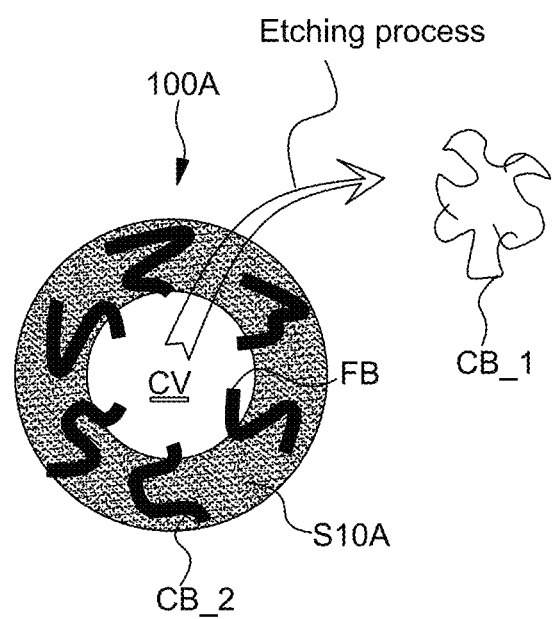

FIGS. 5A and 5B are cross-sectional diagrams showing a wet etching process applicable to fabrication of a low-reflective coating layer having pores according to an embodiment of the present disclosure.

Referring to FIG. 5A, after the polymer layer PL10 may be formed on the substrate SUB10, an etching process may be performed on the polymer layer PL10 by using an etching solvent. At this time, the etching solvent may be a solution capable of permeating into the first compound block contained in the core layer of the spherical micelle having the core-shell structure of the polymer layer PL10, and then selectively removing the first compound block of the core layer of the spherical micelle. For example, the etching solvent may be a solution having polarity, such as ethanol or methanol. However, the type of the etching solvent ES10 is not limited thereto and may vary. Both etching solvent gas and etching solvent liquid may be utilized for removing the core layer Referring to FIG. 5B, the etching solvent may form a cavity CV in the spherical micelle 100A. The etching solvent may penetrate the top surface of the polymer layer PL10 and reach at the core layer C10 of the spherical micelle 10 of FIG. 1A contained in the polymer layer PL10. Contrary to conventional block-copolymer-based systems, the non-covalent bond, for example, hydrogen bond, which may be a secondary bond between the first compound block CB_1 and the second compound block CB_2, may be easily separated by the etching solvent. After the separation between the first compound block CB_1 and the second compound block CB_2, the core layer C11 with the first compound block CB_1 may be removed permanently to form the cavity CV in the spherical micelle 100A. The spherical micelle 100A having the cavity CV may be called as a hollow sphere structure, hereafter. The secondary bond between the first compound block CB_1 and the second compound block CB_2, for example a hydrogen bond in SPS and P2VP, can be easily cleaved and the first compound block CB_1, for example, P2VP molecules can be permanently removed by the etching solvent. For this purpose, the films were immersed in an etching solvent, for example, ethanol as a selective solvent for the first compound block CB_1, for example, P2VP, to solubilize the first compound block CB_1, eventually releasing the first compound block CB_1 from the spherical micelles 10 of FIG. 5B. It may be expected that molecules of the etching solvent selectively penetrate into the nanodomains of the first compound block CB_1, which lowers the density of polymers in the core of the first compound block CB_1 to weaken the secondary bonding. Consequently, molecules of the first compound block CB_1 can be removed from the spherical micelles 10 of FIG. 1A to give opened spherical micelles, i.e., bowl-like structures 100B of FIG. 6. During core-selective solvent exposure to the polymer film PL10, the etching solvent may penetrate through the thin corona, i.e., shell layer S10 of FIG. 1A and diffuse into the core of the spherical micelle 10, which makes the core swell After the removal of the etching solvent, the core 10 of FIG. 1A that has been swollen shrinks, leaving a void volume, i.e., a cavity CV, which gives rise to a core-opened micelle 100B of the FIG. 6. In an example, similar swelling and shrinkage of the core composed of the first compound block CB_1 occurs during the etching solvent treatment, which results in the surface-initiated porous structure, as shown in FIG. 1C.

In an example, the spherical micelle subjected to the etching solvent treatment may become hollow sphere structure 100A or bowl-like structure 100B in which the corona, i.e., the shell layer S10A and S10B is maintained by the remaining second compound block. Furthermore, as shown in FIG. 1C, the polymer layer PL10 may be transformed into the porous layer PL11 having pores PO.

Figure 6:
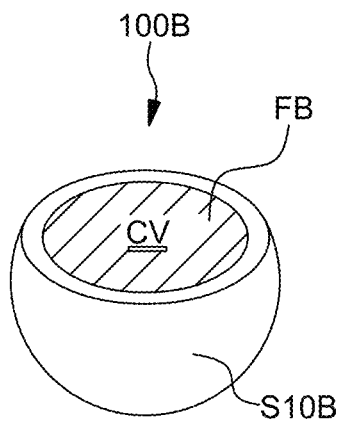
FIG. 6 is a diagram showing a spherical micelle having a cavity formed by removing a first compound block according to an embodiment of the present disclosure.

FIG. 6 is a diagram showing an open spherical micelle, i.e., bowl-like structure 100B having a cavity CV in the porous layer PL11 formed according to an embodiment of the present disclosure. As described above with reference to FIG. 5B, the bowl-like structure 100B having a cavity CV may be formed as the first compound block CB_1 of the core layer C11 is removed via an etching process and the second compound block of the shell layer S12 remains. Due to such the bowl-like structure 100B having a cavity CV, the porous layer PL11 may have pores formed on a first surface and inside the porous layer PL11, and a concavo-convex surface may be formed in the first surface of the porous layer PL11.

Figure 7A:
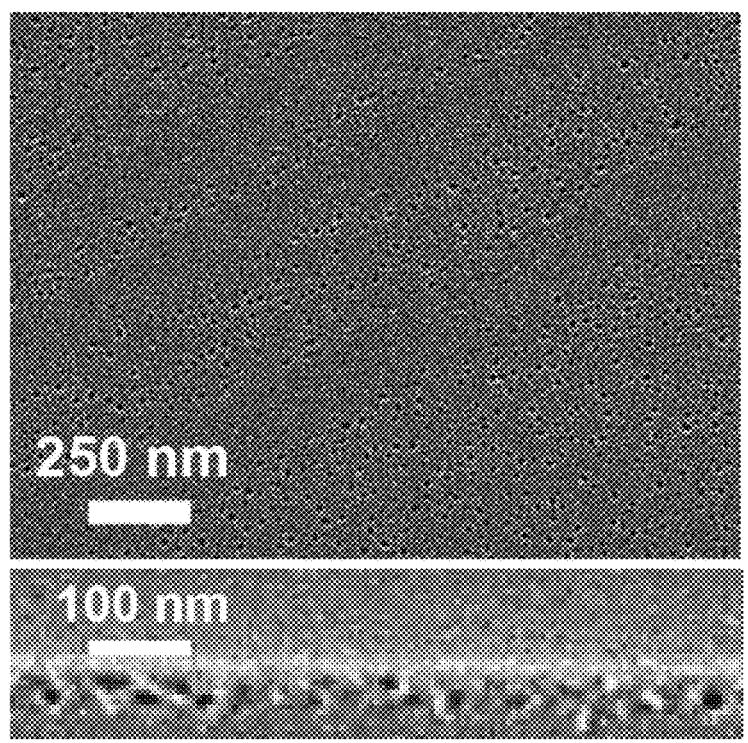
FIGS. 7A through 7G are SEM images of low-reflective coating layers having pores therein and graphs showing physical and chemical characteristics thereof according to the ratios of the polymers when the spherical micelles are formed according to an example of the present disclosure.
Figure 7B:
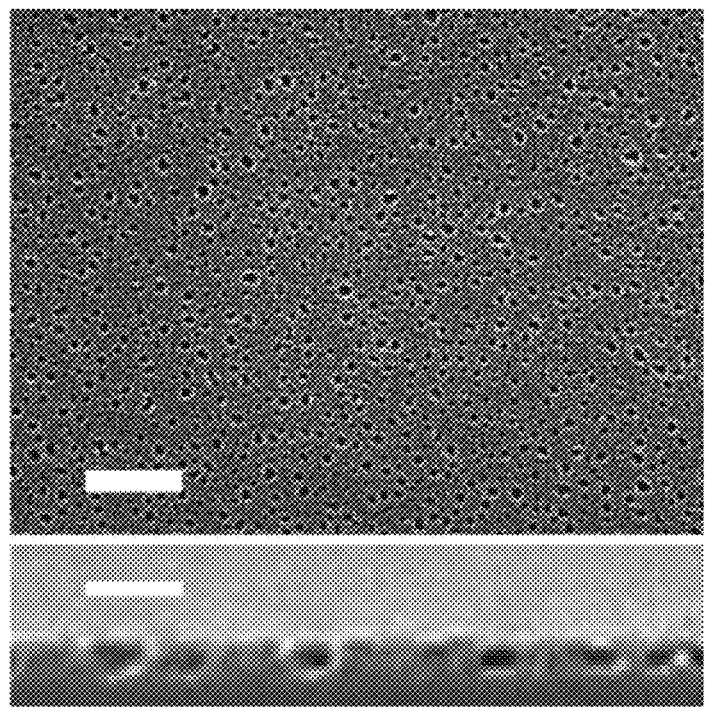
Figure 7C:
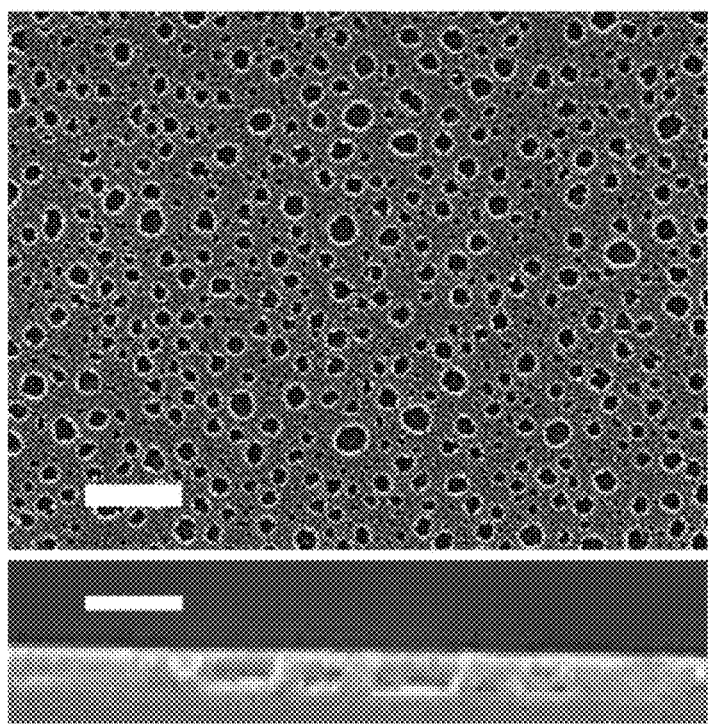
Figure 7D:
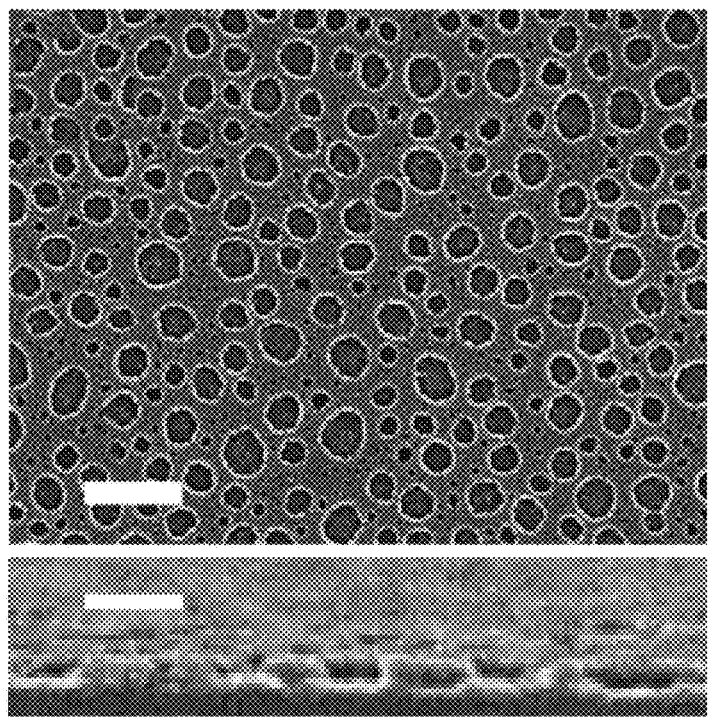
Figure 7E:
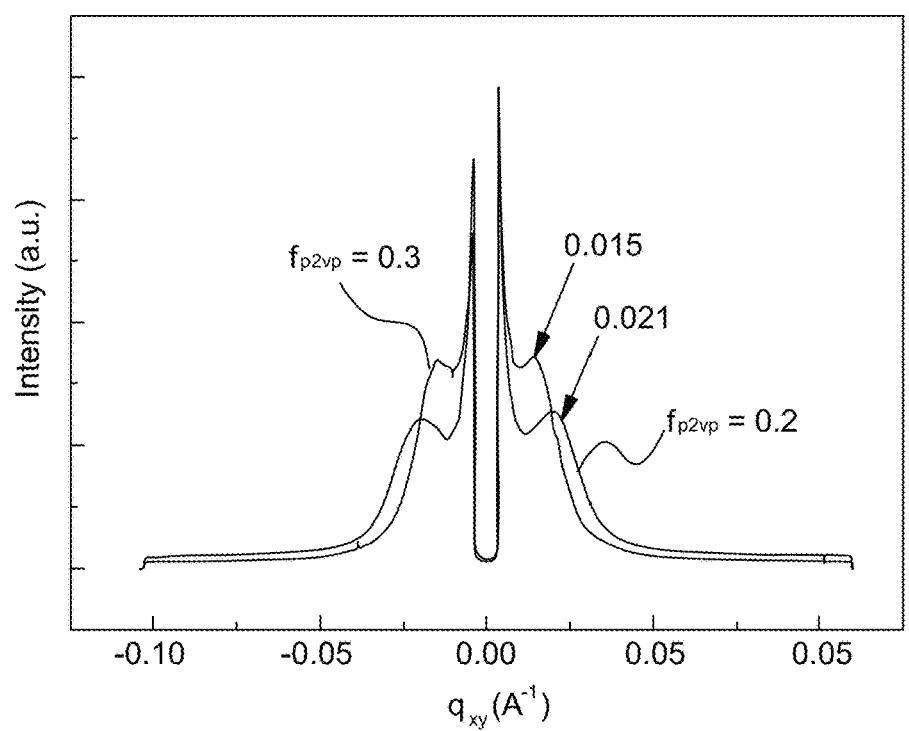
Figure 7F:
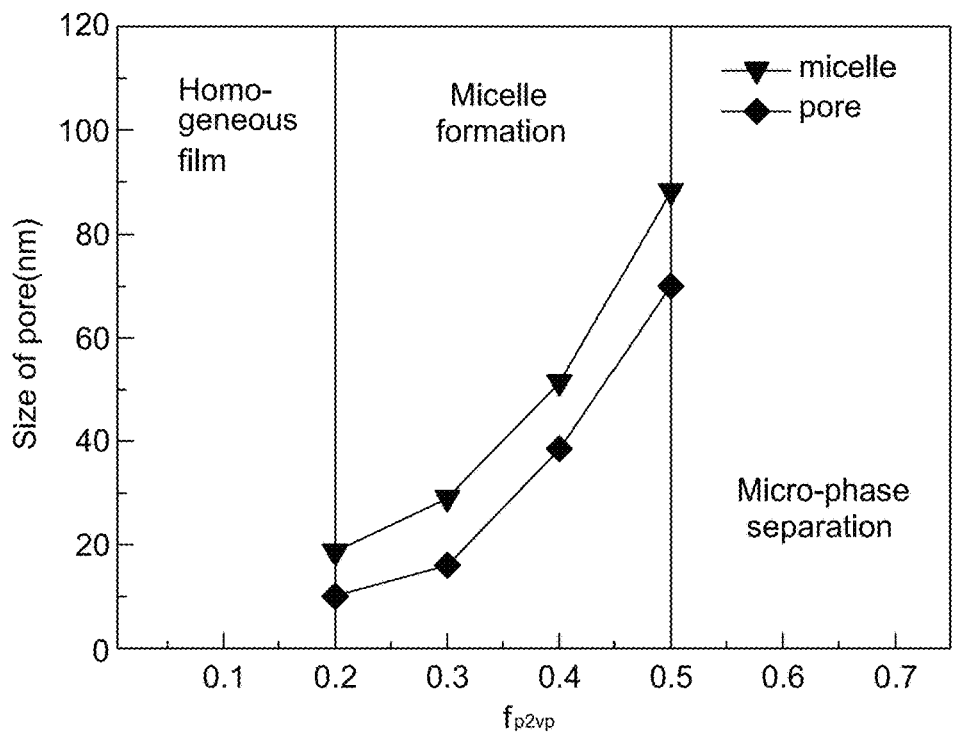
Figure 7G:
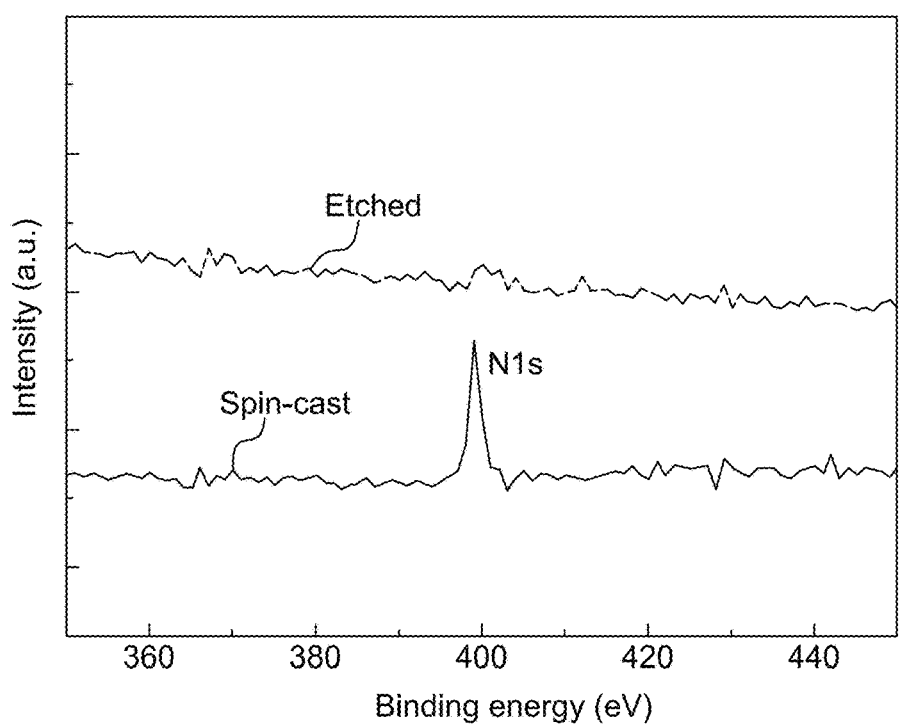

FIGS. 7A through 7D are SEM images of low-reflective coating layers having pores and FIGS. 7E and 7G graphs showing physical and chemical characteristics thereof according to the content ratios of the polymers when the spherical micelles are formed according to an embodiment of the present disclosure.

Referring to FIGS. 7A through 7D, there are SEM images of low-reflective coating layers formed according to various the blend ratio of the first compound block to the total polymer weight included in a mixed solution in order to figure out effects of the blend ratios of the first compound block and the second compound block during self-assembly of the spherical micelles to sizes of pores formed in a low-reflective coating layer during an etching process. Referring to FIG. 7A through 7D, as the blend ratio of the first compound block increases, the size of the pores formed in the low-reflective coating layer also increases.

Furthermore, as shown in FIG. 7E, the diameter of the pores was measured by using GISAXS. As shown in FIG. FIG. 7E, when the blend ratios of the first compound block were 0.2 and 0.3, peaks were observed at 0.021 and 0.015 A-1 of the scattering vector $q_{xy}$. The result indicates that the diameters of the pores corresponding to the blend ratios are about 30 nm and about 42 nm, respectively Referring to FIG. 7F, it may be preferable that the blend ratio ($f_{P2VP}$) of the first compound block to the total weight of the polymers, i.e., the first compound block and the second compound block during formation of the spherical micelle is from about 0.2 to about 0.5. When the blend ratio ($f_{P2VP}$) of the first compound block is less than 0.2, a simple mixture of the first compound block and the second compound block is formed instead of the spherical micelle. When the blend ratio ($f_{P2VP}$) of the first compound block exceeds 0.5, small spherical micelles and the condensed first compound block remain to be mixed with each other, and thus a polymer layer including uniformly distributed spherical micelles may not be formed. Furthermore, when the blend ratio ($f_{P2VP}$) of the first compound block is from about 0.2 to about 0.5, when an etching process with reference to FIGS. 5A and 5B is performed, the diameter of the pores formed by removing the first compound block of the spherical micelle becomes smaller than the diameter of the spherical micelle.

FIG. 7G is a diagram showing an X-ray photoelectron spectroscopy (XPS) measurement results regarding the polymer layer PL10 of FIG. 1B and the porous layer PL11 of FIG. 1C when the blend ratio $f_{P2VP}$ of the first compound block is about 0.4.

Referring to FIG. 7G, since the first compound block, which is poly-2-vinylpyrimidine (P2VP), includes nitrogen atoms in the polymer layer PL10 before the etching process, a peak was found at binding energy of about 400 eV. However, no peak was observed in a binding energy region around 400 eV in an X-ray photoelectron spectroscopy regarding the porous layer PL11 after the etching process. Therefore, the core layer of the spherical micelle contained in the polymer layer PL10, that is, the first compound block was removed via the etching process regarding the polymer layer PL10, and thus the porous layer PL11 was formed.

Furthermore, the spherical micelle having a cavity included in the porous layer PL11 may be a potential functional group having a functional group remaining on an inner surface of the shell layer S11 (FIG. 5B) after the etching process, such as a sulfone group, performs an additional function group. In an example, the sulfonated group may be reversibly hydrogen bonded to a pyrimidine-based compound or a purine-based compound again to form a self-assembled polymer or the sulfonated group may exhibit high proton conductivity to imbue the spherical micelle 11 having a cavity excellent electrochemical stability at a high temperature. However, the function of the potential functional group remaining on the surface of the shell layer is not limited thereto.

Figure 8A:
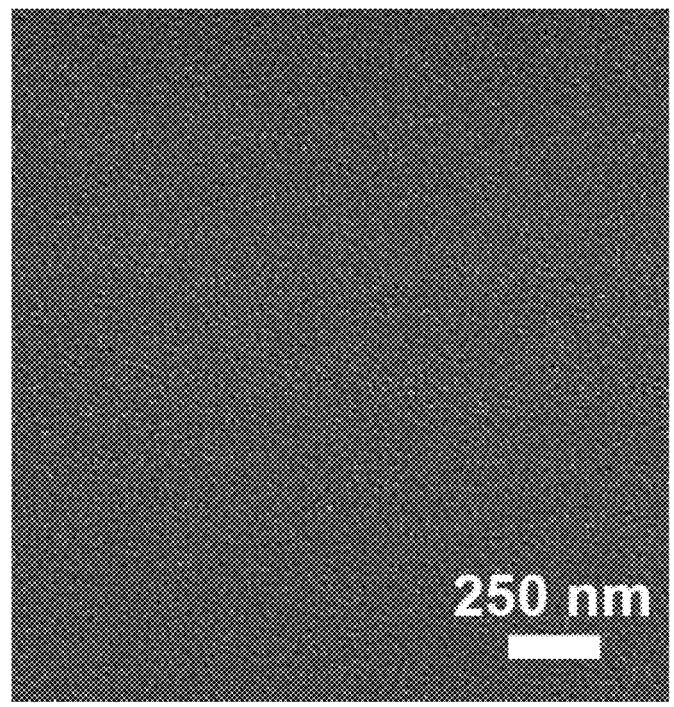
FIGS. 8A through 8F are SEM images of low-reflective coating layers having pores therein and graphs showing physical and chemical characteristics thereof according to the respective ratios of the polymers to an entire solution according to an embodiment of the present disclosure.
Figure 8B:
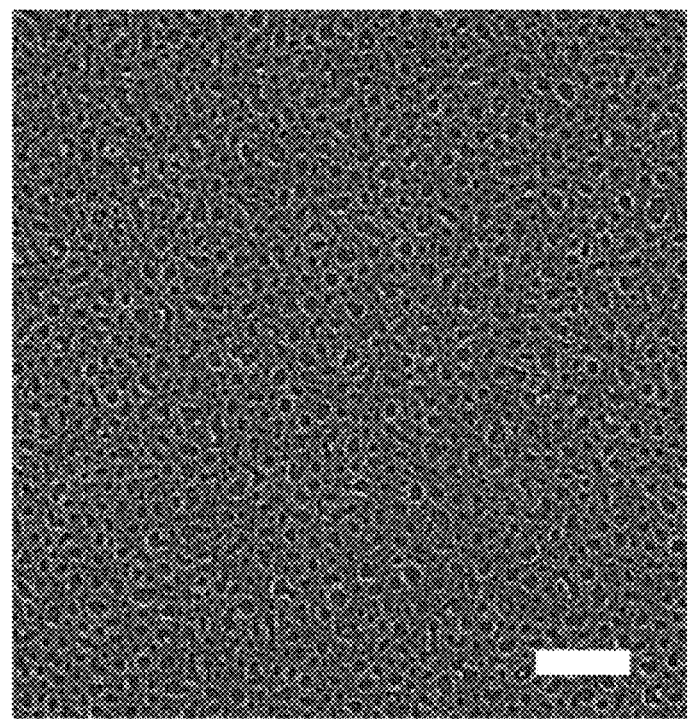
Figure 8C:
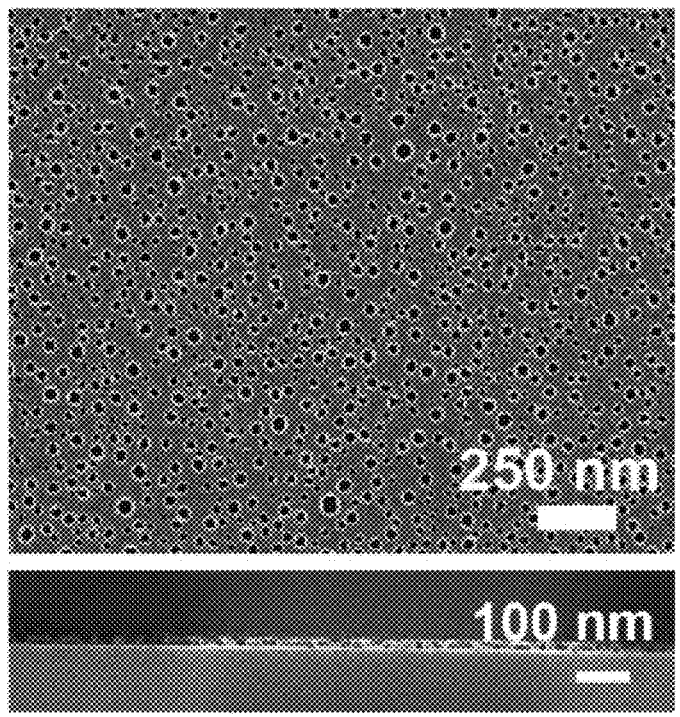
Figure 8D:
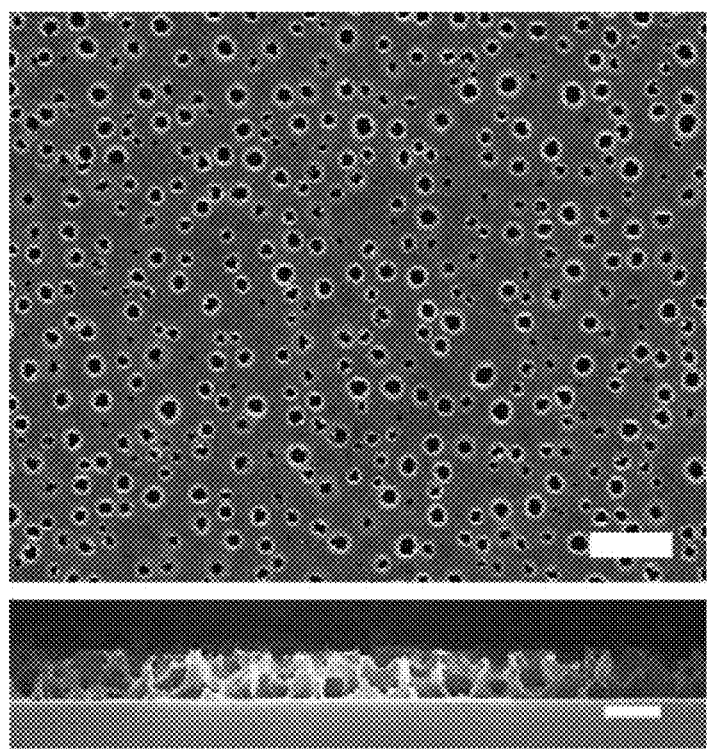
Figure 8E:
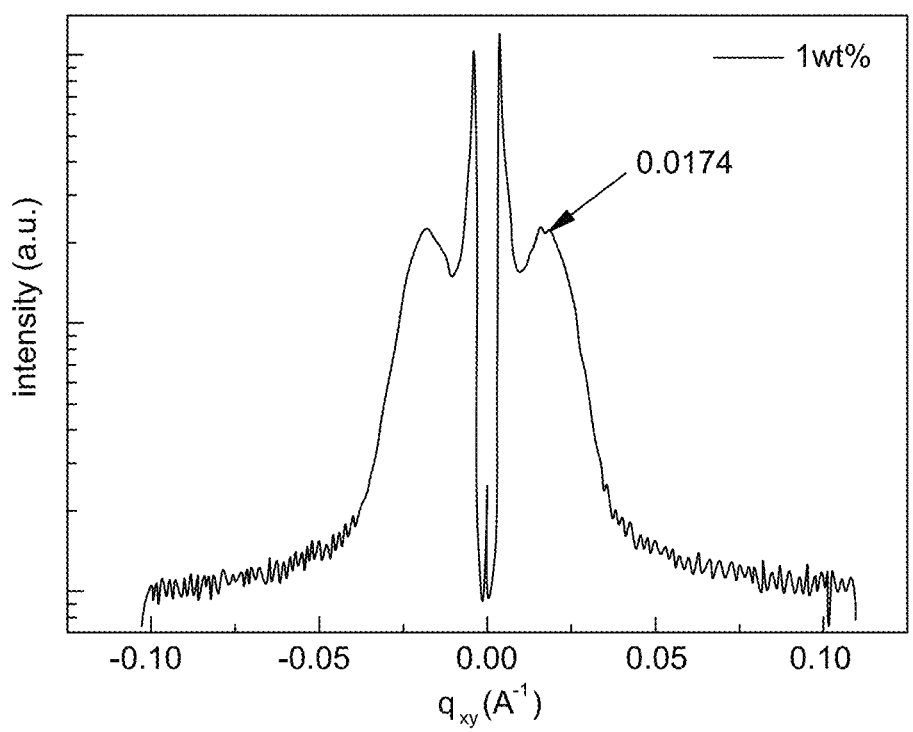
Figure 8F:
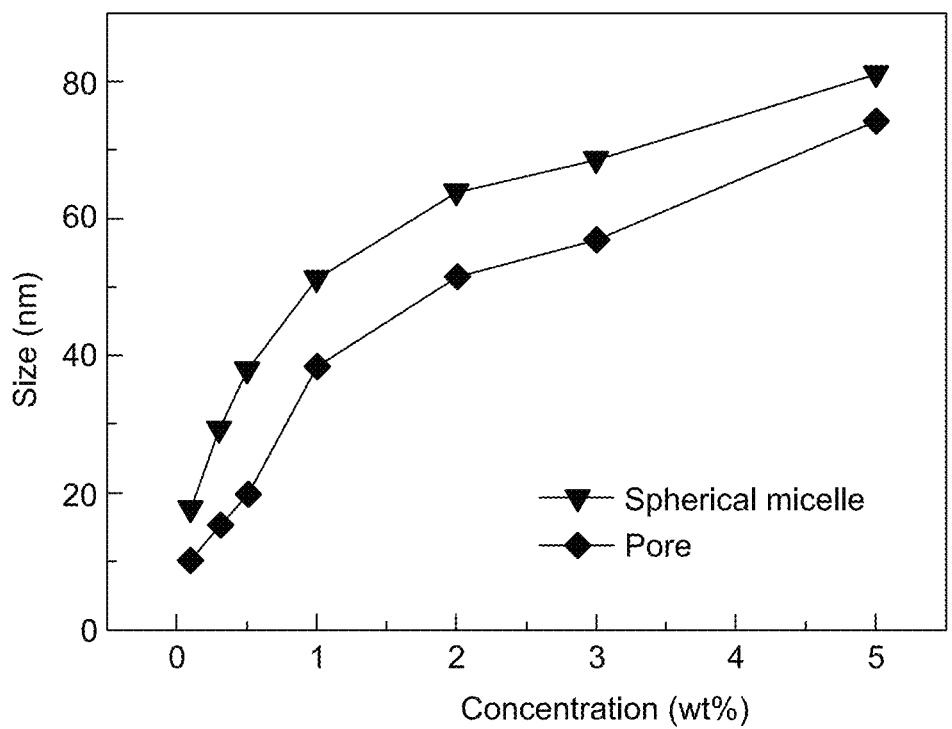

FIGS. 8A through 8D are SEM images of low-reflective coating layers having pores and FIGS. 8E and 8F are graphs showing physical and chemical characteristics thereof according to the content ratios of the polymers when the spherical micelles are formed according to an embodiment of the present disclosure.

FIGS. 8A through 8D are SEM images of the porous layers PL11 of FIG. 1C having pores according to a fixed blend ratio $f_{P2VP}$ of the first compound block of 0.4 and various concentrations (0.1 wt %, 0.5 wt %, 2 wt %, and 5 wt %) in an entire mixed solution. Referring to FIG. 8A through 8D, as the concentration of the polymer in the entire mixed solution increased from 0.1 wt % to 5 wt %, the size of pores of the porous layer PL11 also increased from about 20 nm to about 80 nm. Furthermore, referring to FIG. 8E, when the overall concentration of the polymers was 0.1 wt %, a peak was found at a scattering vector $q_{xy}$ of 0.0174 A-1. This indicates that the diameter of the pores is about 36 nm.

As shown in FIG. 8F, the sizes of the spherical micelles in the polymer layer (PL10) and the sizes of the pores in the porous layer (PL11) before and after the etching process were measured according to various concentrations of the polymers in the entire mixed solution. Referring to FIG. 8F, as the concentrations of the polymers increased, both the size of the spherical micelle and the size of the pores increased. Furthermore, the size of the spherical micelle was larger than the size of the pores under the condition that the concentrations of the polymers were identical to each other. The reason thereof is that, when the first compound block included in the spherical micelle core layer is removed by the etching solvent to form a cavity, that is, a pore, the shell layer remains and only the core layer is removed and the radius of the core is measured during the measurement of the size of pores.

Figure 9A:
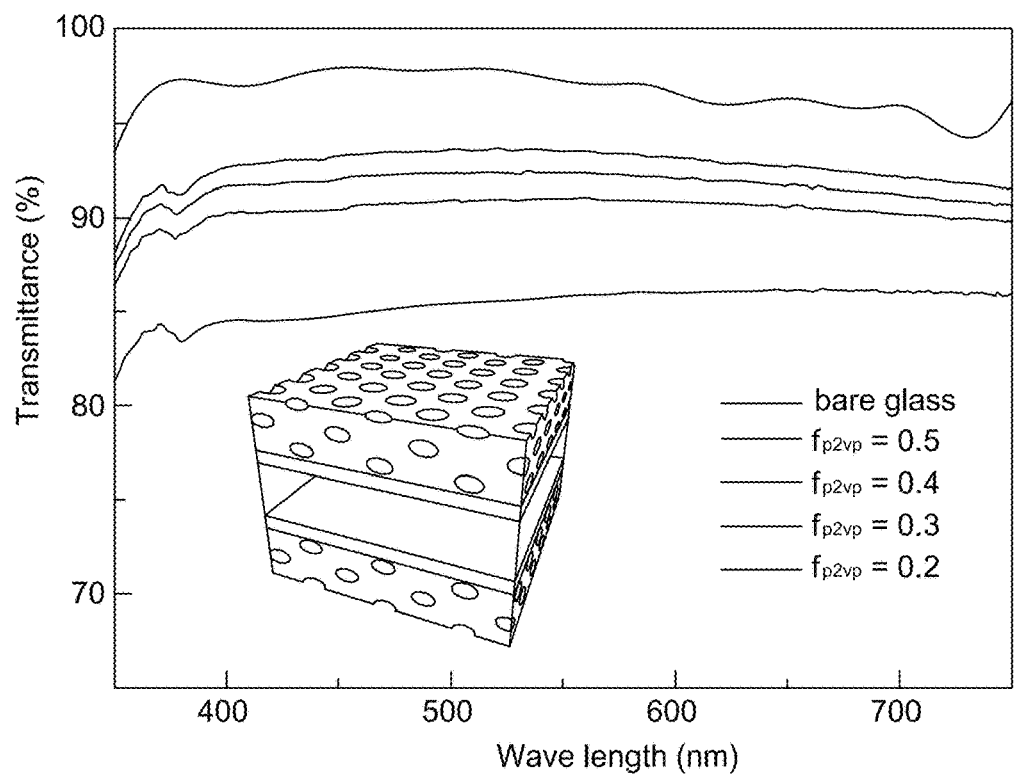
FIGS. 9A and 9B are diagrams showing light transmittances of an optical member having pores according to an embodiment of the present disclosure.
Figure 9B:
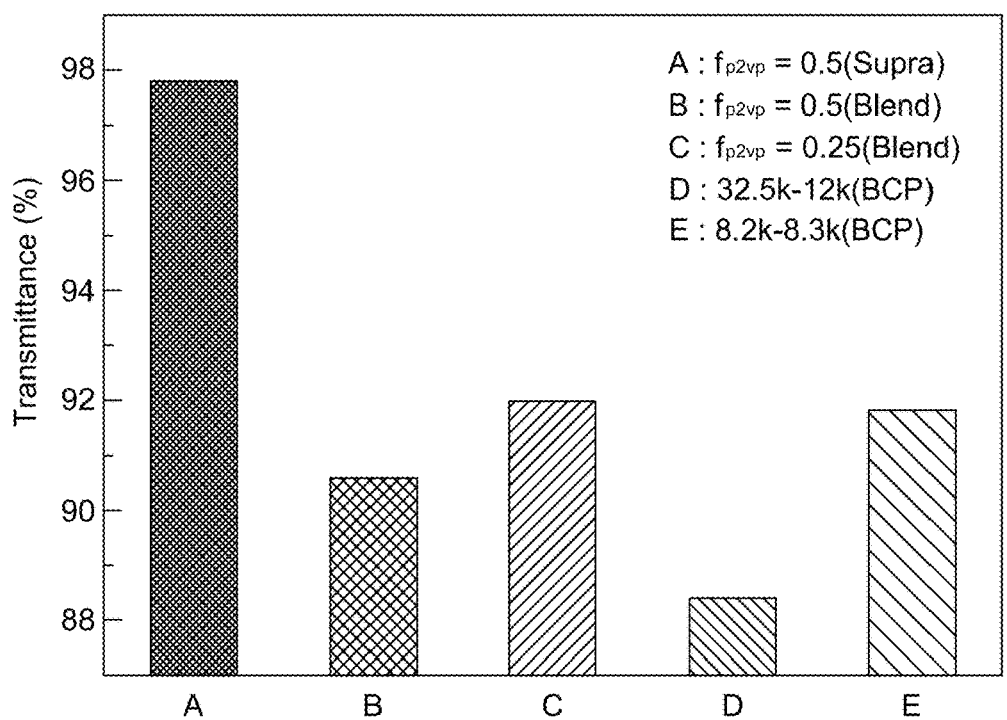
Figure 9C:
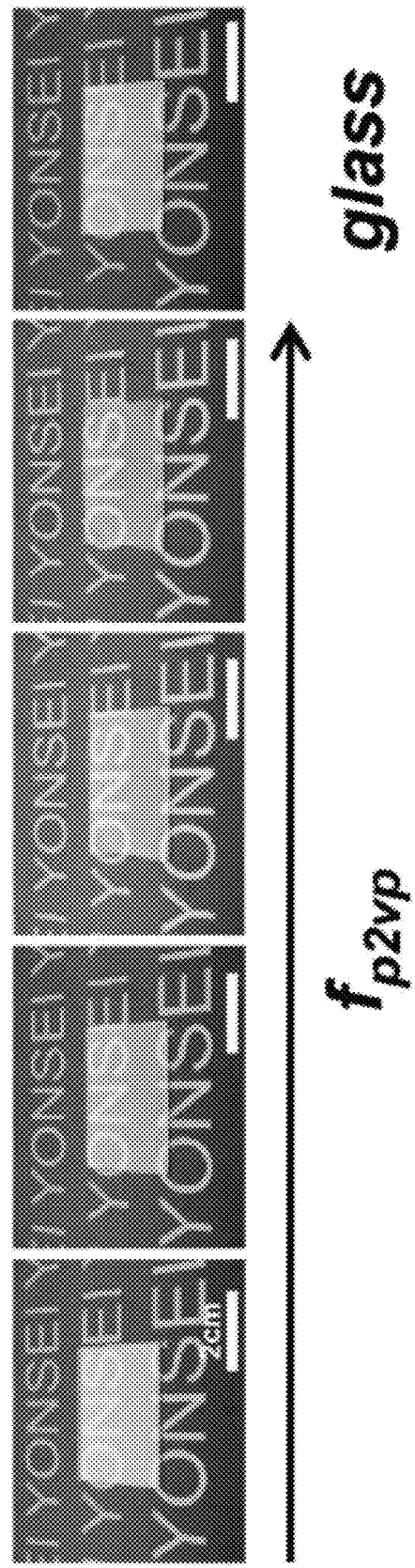
FIG. 9C is photo images of porous layers with various $f_{p2vp}$ and bare glass substrate layer.

FIGS. 9A and 9B are diagrams showing light transmittances of an optical member having pores according to an embodiment of the present disclosure, and FIG. 9C is photo images of porous layers with various fp2vp and bare glass substrate layer.

The optical member may include a substrate layer SUB11 and a porous layer PL11 having pores that are formed according to a method of fabrication illustrated by FIGS. 1A through 8F. The light transmittance of the optical member may be measured according to the below Mathematical Expression 1.

$$\text{reflectivity} = \frac{(n_s - n_c^2)^2}{(n_s + n_c^2)^2} \quad \text{[Mathematical Expression 1]}$$

$$n_c^2 = n_{polymer}^2(1 - f_{pore}) + n_{air}^2 f_{pore}$$

In Mathematical Expression 1, $n_{polymer}$ and $f_{pore}$ represent the refractive index of the polymer layer PL10 and the porosity of the porous layer PL11, respectively. Since the size of the pores, that is, the porosity of the porous layer PL11 may be easily controlled according to the blend ratio of polymers and the concentration of the polymers, the light transmittance of the porous layer PL11 may also be easily controlled.

As shown in FIG. 9A, the light transmittance of the optical member according to various blend ratios $f_{P2VP}$, i.e., 0.2, 0.3, 0.4 and 0.5 of the first compound block contained in the polymer layer PL10 during the formation of the polymer layer PL10 was compared to the light transmittance of a glass layer as a comparative example. Referring to FIG. 9A, when the blend ratio was 0.2, the number of the pores formed in the porous layer PL11 is not sufficient to reduce the refractive index $n_c$ of the polymer layer of the Mathematical Expression 1, and thus the light transmittance of the corresponding optical member is lower than that of the glass layer. Meanwhile, when the blend ratio was 0.5, the corresponding optical member exhibited the maximum light transmittance of 97.8% at the wavelength of 511 nm. In other words, an optical member according to an embodiment of the present disclosure exhibited light transmittance higher than that of the glass layer of the comparative example when the blend ratio of the first compound block was from about 0.3 to about 0.5.

Referring to FIG. 9B, the light transmittance of an optical member according to the present disclosure, which is a sample "A" having a supra-molecularly assembled structure (Supra) and $f_{p2vp}$=0.5 is compared with those of comparative samples B, C, D and E. The comparative samples B and C are films formed from a solution of simply blended polystyrene and poly(2-vinyl pyridine) polystyrene with varying $f_{p2vp}$, i.e., 0.5 and 0.25, respectively. Macroscopic phase separation is shown in the solution due to a deficiency of secondary coupling between polystyrene and poly(2-vinyl pyridine) polystyrene. The comparative samples D and E are films formed from a block copolymer (BCP) of PS-b-P2VP with varying molecular weight and ratio, 32.5 k-12 k and 8.2 k-8.3 k, respectively.

The light transmittances of the samples A through E are measured at a wavelength of 500 nm. The sample A having the supra-molecularly assembled porous film shows best anti-reflection performance among the samples A through E. It may be because of a uniform porous morphology of the sample A compared with other samples B through E.

The light transmittance performance may be controlled by the porosity of the pores formed in the porous layer according to the present disclosure. In FIG. 9C, the porous layers with various $f_{p2vp}$ illustrate excellent light transmittance. Since an optical member of the present disclosure has an excellent anti-reflectivity, the optical member may be effectively utilized for optical devices, such as solar cells and display devices.

Hereinafter, a method of fabricating a low-reflective coating layer according to an embodiment of the present disclosure will be briefly described. According to an embodiment of the present disclosure, the method of manufacturing a low-reflective coating layer includes preparing spherical micelles formed as a first compound block constituting the backbone of a spherical micelle and a second compound block constituting a side chain non-covalent bonded to the first compound block are mixed with each other and are self-assembled; and applying an etching solvent to the spherical micelles to remove the first compound blocks from the spherical micelles and arranging spheres having cavities formed by the remaining second compound block.

Here, the first compound block may have a higher solubility than the solubility of the second compound block with respect to the etching solvent. Furthermore, according to an embodiment, the diameter of the spherical micelle may be adjusted according to the concentration of the second compound block. In the operation for arranging the spheres having cavities, the diameter of the pores may be adjusted according to the molecular weight of the second compound block with respect to the first compound block or the diameters of the first compound block and the second compound block with respect to the etching solvent during the self-assembly of polymers to the spherical micelles. The diameter of the pores may be controlled according to the concentration of the first compound block and the second compound block. The method of forming the low-reflective coating layer may be the same as or similar to the description given above with reference to FIGS. 1A through 1C, 5A and 5B. Therefore, detailed description on formation of a low-reflective coating layer will not be repeated.

As described above, according to various embodiments of the present disclosure, a low-reflective coating layer having a high light transmittance and capable of reducing reflections and refractions of incident light may be easily fabricated. Furthermore, a light-emitting member including the low-reflective coating layer may be implemented. In particular, according to embodiments of the present disclosure, pores may be easily formed in the polymer layer by using two or more self-assembled polymers and a practical method and a practical technique for controlling the size of the pores may be implemented. Therefore, an optical member with minimized total internal reflection may be easily fabricated, and a light-emitting device package having excellent light-emitting efficiency and thermal stability may be implemented by applying the optical member.

According to an embodiment of the present disclosure, by forming a spherical micelle having a cavity by removing a polymer of the core layer of the spherical micelle according to a total concentration of two or more polymers included in the spherical micelle during a self-assembly or blend ratios of the two or more polymers, the size of pores included in a porous layer may be easily controlled, and thus a low-reflective coating layer having a high light transmittance and capable of reducing reflection and refraction of incident light may be provided. Therefore, since a low-reflective coating layer with minimized total internal reflection may be easily fabricated, a light-emitting device package having excellent light-emitting efficiency and thermal stability may be implemented.

Furthermore, a sphere micelle having a cavity therein may contain a potential functional group on its inner surface, so that the functional group may exhibit high proton conductivity to imbue the sphere micelle excellent electrochemical stability at a high temperature or other physical, chemical or optical characteristics. The potential functional group may be utilized as any chemical bonding site for another chemical species.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A low-reflective coating layer coated on a light transmissive substrate, the low-reflective coating layer comprising a porous film having hollow sphere structures and bowl-like structures, each hollow sphere structure and bowl-like structure having cavity formed therein,
    wherein the hollow sphere structures and the bowl-like structures are formed from spherical micelles, and each spherical micelle is formed by self-assembling a supramolecular complex of a first compound block and a second compound block,
    wherein the first compound block constitutes a backbone of the supramolecular chemical compound, the second compound block constitutes a side chain of the supramolecular, the second compound block is non-covalent bonded to the first compound block and the second compound block is bonded to a side portion of the first compound block rather than an end of the first compound block,
    wherein pores of the porous film are defined by the cavity and the cavity is formed by removing the first compound block selectively from the spherical micelles and remaining the second compound block as a body of each of the hollow sphere structures and the bowl-like structures,
    wherein light transmittance of a coated structure having the light transmissive substrate and the low-reflective coating layer is higher than light transmittance of the light transmissive substrate in a bare state.

2. The low-reflective coating layer of claim 1,
    wherein each spherical micelle has a core layer and a shell layer surrounding the core layer, and
    where the first compound block constitutes the core layer and the second compound block layer constitutes the shell layer.

3. The low-reflective coating layer of claim 1, wherein the first compound block has solubility higher than that of the first compound block with respect to the etching solvent.

4. The low-reflective coating layer of claim 1, wherein the diameter of the spherical micelles is adjusted by controlling the blend ratio of the first compound block and the second compound block.

5. The low-reflective coating layer of claim 3, wherein the blend ratio of the first compound block in the first compound block and the second compound block is within 0.2 and 0.5.

6. The low-reflective coating layer of claim 1, wherein the first compound block comprises a functional group selected from a group consisting of —X2-(C=X4)-X3-, —NR5-(SO2)-, —CO—NR6-CO—, —O—, —S—, —COOH, —CN, —NR7R8, —OH, and —SH,
    wherein each of the X2 and the X3 is any one of a single bond, —NR9-, —O—, and —(CR10R11)$_m$—, and
    wherein each of the R5, R6, R7, R8, R9, R10, and R11 represents a hydrogen atom or an alkyl group having a substituent, and m represents an integer equal to or greater than 1.

7. The low-reflective coating layer of claim 1, wherein the first compound block comprises any one or more of poly-2-vinyl-pyridine (P2VP), pyrimidine, 2-methylpyrimidine, 4-methylpyrimidine, 5-methylpyrimidine, 4,6-dimethylpyrimidine, 4,6-methoxypyrimidine, 2-ethylpyrimidine, 4-ethylpyrimidine, 5-ethylpyrimidine, 4,6-diethylpyrimidine, 2-methoxypyrimidine, 4-methoxypyrimidine, 5-methoxypyrimidine, 2-ethoxypyrimidine, 4-methoxypyrimidine, 5-ethoxypyrimidine polyamic acid, and polyolefin ketone.

8. The low-reflective coating layer of claim 1, wherein the second compound block comprises any one or more of sulfonic acid terminated polystyrene (SPS), syndiotactic polystyrene, polystyrene, sulfuronite polystyrene, and sulfuronite silsesquioxane.

9. The low-reflective coating layer of claim 1, wherein the second compound block has a functional group and the functional group is non-covalent bonded to the first compound block.

10. The low-reflective coating layer of claim 9, wherein the functional group remains on the inner surface of the cavity for serving a potential functional site.

* * * * *